(12) United States Patent
Han et al.

(10) Patent No.: US 7,525,751 B2
(45) Date of Patent: Apr. 28, 2009

(54) HARD DISK DRIVE ADAPTED TO DETECT FREE-FALL AND PERFORM EMERGENCY PARKING OF READ/WRITE HEAD PRIOR TO IMPACT

(75) Inventors: Jae-hyuk Han, Seoul (KR); Cheol-soon Kim, Anyang-si (KR); Gun-hee Jang, Seoul (KR); Sang-jin Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 79 days.

(21) Appl. No.: 11/598,075

(22) Filed: Nov. 13, 2006

(65) Prior Publication Data

US 2007/0109679 A1    May 17, 2007

(30) Foreign Application Priority Data

Nov. 14, 2005  (KR) .................. 10-2005-0108525
Mar. 31, 2006  (KR) .................. 10-2006-0029816

(51) Int. Cl.
*G11B 21/02*   (2006.01)
(52) U.S. Cl. .................................................... 360/75
(58) Field of Classification Search ................ None
See application file for complete search history.

(56) References Cited

U.S. PATENT DOCUMENTS

| 5,227,929 | A | * | 7/1993 | Comerford | .................. 360/75 |
|---|---|---|---|---|---|
| 6,101,062 | A | * | 8/2000 | Jen et al. | ..................... 360/75 |
| 6,798,605 | B2 | * | 9/2004 | Kurita et al. | .................. 360/75 |
| 7,029,179 | B2 | * | 4/2006 | Shishido et al. | ............. 384/107 |
| 7,355,807 | B2 | * | 4/2008 | Jeansonne et al. | ............. 360/75 |
| 7,356,437 | B2 | * | 4/2008 | Kobayashi et al. | ........... 702/127 |
| 7,369,345 | B1 | * | 5/2008 | Li et al. | ....................... 360/75 |

FOREIGN PATENT DOCUMENTS

| JP | 2002-100180 | 4/2002 |
|---|---|---|
| JP | 2005-078767 | 3/2005 |
| KR | 1020050033463 | 4/2005 |

* cited by examiner

*Primary Examiner*—K. Wong
(74) *Attorney, Agent, or Firm*—Volentine & Whitt, P.L.L.C.

(57) ABSTRACT

Embodiments of the invention provide a hard disk drive (HDD) adapted to detect when an HDD is in a free-fall state and park a head prior to impact. The HDD comprises a spindle motor comprising a rotary body and adapted to rotate a disk, wherein the disk is adapted to store data; an actuator adapted to move a read/write head to a desired position above the disk in order to read/write data; and a flying height sensor adapted to measure a flying height of the rotary body in real time. The HDD further comprises a monitor adapted to monitor the measured flying height and generate a free-fall signal when the monitor determines that the HDD is in a free-fall state; and a central controller adapted to initiate an operation for parking the read/write head in response to the free-fall signal.

16 Claims, 25 Drawing Sheets

HORIZONTAL ORIENTATION

OBLIQUE ORIENTATION

VERTICAL ORIENTATION

HORIZONTAL ORIENTATION

OBLIQUE ORIENTATION

VERTICAL ORIENTATION

HORIZONTAL ORIENTATION

OBLIQUE ORIENTATION

VERTICAL ORIENTATION

HORIZONTAL ORIENTATION

OBLIQUE ORIENTATION

HORIZONTAL ORIENTATION

OBLIQUE ORIENTATION

VERTICAL ORIENTATION

HORIZONTAL ORIENTATION

OBLIQUE ORIENTATION

VERTICAL ORIENTATION

HORIZONTAL ORIENTATION

OBLIQUE ORIENTATION

VERTICAL ORIENTATION

HARD DISK DRIVE ADAPTED TO DETECT FREE-FALL AND PERFORM EMERGENCY PARKING OF READ/WRITE HEAD PRIOR TO IMPACT

BACKGROUND

1. Field of the Invention

Embodiments of the invention relate to a hard disk drive (HDD). In particular, embodiments of the invention relate to an HDD adapted to detect free-fall and park a read/write head in a safe position in response to free-fall detection.

This application claims priority to Korean Patent Application Nos. 10-2005-0108525, filed on Nov. 14, 2005 and 10-2006-0029816, filed on Mar. 31, 2006, the collective subject matter of which is hereby incorporated by reference in its entirety.

2. Description of Related Art

A hard disk drive (HDD) is an information storing apparatus commonly used in computers and adapted to read data from and write data to a rotating disk using one or more read/write head(s). In the HDD, an actuator moves the read/write head to a desired position above the disk so that data may be written to or read from an identified location on the disk. During such movements, the read/write head is maintained at a defined "flying height" above the surface of the disk.

However, if the read/write head fails to maintain the defined flying height and collides with the surface of the disk, the surface of the disk may become damaged making data stored at damaged location unreadable. Read/write head collisions with the disk may result from an external impact applied to the HDD. Since HDDs are being more commonly incorporated into portable host devices, the risk of external impacts due to dropping of the host device is increasing. This risk of "disk crash" militates against the incorporation of HDDs into emerging portable devices despite the excellent ratio of price to storage capacity provide by HDDs. However, the obvious commercial advantages provided by HDDs in portable electronic devices has lead to much ongoing research into the design and use of micro HDDs having a size of 1-inch or less.

For example, U.S. Pat. No. RE35,269, the subject matter of which is hereby incorporated by reference, discloses a method for detecting a free-fall state for an HDD (i.e., a condition wherein an HDD is falling under the influence of gravity). This conventional method uses a MEMS (microelectromechanical system) acceleration sensor to detect the free-fall state and unload a read/write head. The term "unload" is this context refers to an operation wherein a read/write head is moved into a safe position (i.e., a position better immune to the ill-effects of an external impact). However, this conventional approach adds cost and complexity to the HDD design in relation to the incorporation of the MEMS acceleration sensor. Further, the addition of the MEMS acceleration sensor results in an unacceptable increase in the volume of many micro HDD designs intended for use within portable devices, such as mobile phones, PDAs, etc.

SUMMARY OF THE INVENTION

Embodiments of the invention provide a hard disk drive (HDD) adapted to prevent a read/write head or a disk within an HDD from being damaged by an external impact following free-fall. This ability provides improved impact resistance and makes the HDD a better design choice for incorporation within various potable or mobile devices.

Embodiments of the invention also provide an HDD adapted to detect a free-fall state with a high degree of accuracy in various orientations. As a result of this free-fall state detection, an HDD is better able to initiate emergency unloading/parking of a read/write head.

In one embodiment, the invention provides a hard disk drive (HDD) comprising; a spindle motor comprising a rotary body and adapted to rotate a disk, an actuator adapted to move a read/write head to a desired position above the disk, a flying height sensor adapted to measure in real time a flying height associated with the rotary body, a monitor adapted to monitor the measured flying height and generate a free-fall signal when the monitor determines that the HDD is in a free-fall state, and a central controller adapted to initiate an unloading/parking operation for the read/write head in response to the free-fall signal.

In another embodiment, the invention provides an HDD comprising; a spindle motor adapted to rotate a disk, an actuator adapted to move a read/write head over the disk, a rotation speed sensor adapted to measure in real time a rotation speed for the spindle motor, a monitor adapted to monitor the measured rotation speed and generate a free-fall signal when the monitor determines that the HDD is in a free-fall state, and a central controller adapted to initiate an unloading/parking operation in response to the free-fall signal.

In another embodiment, the invention provides an HDD comprising; a spindle motor adapted to rotate a disk at a defined rotation speed, a feedback control loop adapted to control in real time the rotation speed using a driving signal provided to the spindle motor, an actuator adapted to move a read/write head over the disk, a monitor adapted to monitor the driving signal and generate a free-fall signal when the monitor determines that the HDD is in a free-fall state, and a central controller adapted to initiate an unloading/parking operation for the read/write head in response to the free-fall signal.

In another embodiment, the invention provides an HDD comprising: a spindle motor comprising a rotary body and a static body adapted to support the rotary body, wherein the spindle motor is adapted to rotate a disk, an actuator adapted to move a read/write head over the disk, a static eccentricity sensor adapted to measure static eccentricity associated with the rotary body, a monitor adapted to monitor the measured static eccentricity and generate a free-fall signal when the monitor determines that the HDD is in a free-fall state, and a central controller adapted to initiate an unloading/parking operation for the read/write head in response to the free-fall signal.

In another embodiment, the invention provides an HDD comprising; a spindle motor adapted to rotate a disk comprising a target track, an actuator adapted to move a read/write head around a pivot to position the read/write head over the target track, a position error sensor adapted to measure in real time a position error between the actual position of the read/write head and the target track and further adapted to generate a position error signal, a monitor adapted to monitor the position error signal and generate a free-fall signal when the monitor determines that the HDD is in a free-fall state, and a central controller adapted to initiate an unloading/parking operation for the read/write head in response to the free-fall signal.

In another embodiment, the invention provides an HDD) comprising; a spindle motor adapted to rotate a disk, a voice coil motor (VCM) adapted to supply rotary driving power to an actuator adapted to move a read/write head over the disk, a position control loop adapted to apply a controlled driving signal to the VCM to cause the read/write head to follow a target track on the disk, a monitor adapted to monitor in real time the controlled driving signal supplied to the VCM and generate a free-fall signal when the monitor determines that the HDD is in a free-fall state, and a central controller adapted to initiate an unloading/parking operation for the read/write head in response to the free-fall signal.

In another embodiment, the invention provides an HDD comprising; a spindle motor adapted to rotate a disk at a rotation speed controlled in real time in accordance with a driving signal provide by a feedback control loop, a voice coil motor (VCM) adapted to supply rotary driving power to an actuator moving a read/write head over the disk, a position control loop adapted to apply a controlled driving signal to the VCM to cause the read/write head to follow a target track on the disk, a monitor adapted to monitor in real time the driving signal and the controlled driving signal, and generate a free-fall signal when the monitor determines that the HDD is in a free-fall state and a central controller is adapted to initiate an unloading/parking operation for the read/write head in response to the free-fall signal.

BRIEF DESCRIPTION OF THE DRAWINGS

Embodiments of the invention will be described herein with reference to the accompanying drawings, in which like reference symbols indicate like or similar elements. In the drawings.

DESCRIPTION OF EMBODIMENTS

Figure 1:
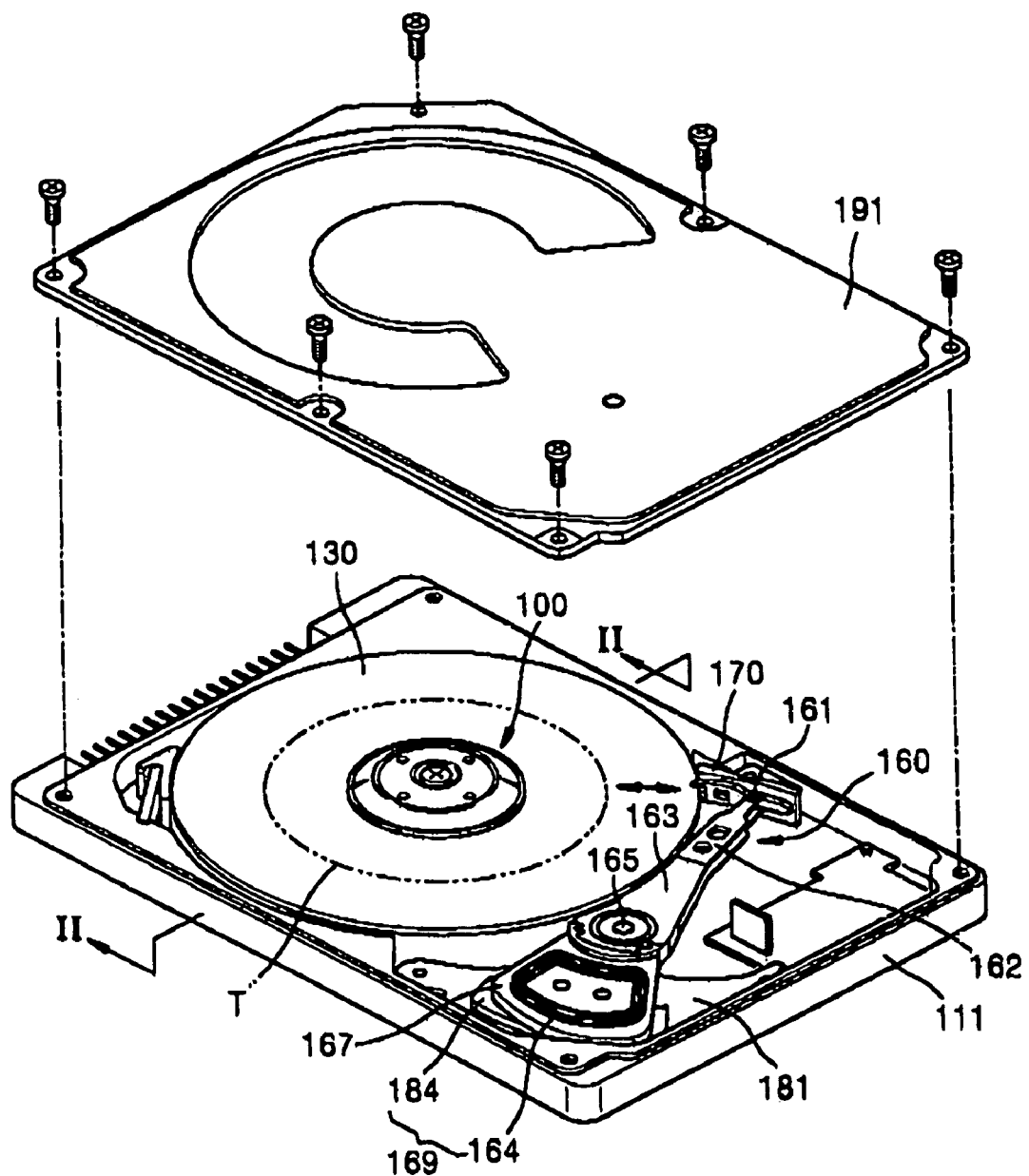
FIG. 1 is an exploded perspective view of a hard disk drive (HDD) in accordance with an embodiment of the invention.

FIG. 1 is an exploded perspective view of a hard disk drive (HDD) in accordance with an embodiment of the invention. Referring to FIG. 1, the HDD comprises a spindle motor 100 adapted to rotate one or more disk(s) 130. The HDD further comprises an actuator 160 adapted to pivot at a point outside of the circumference of disk 130. Actuator 160 connects a read/write head 161 and is adapted to move read/write head 161 to a desired position above disk 130. The HDD still further comprises a voice coil motor (VCM) 169 adapted to supply rotary driving power to actuator 160.

Spindle motor 100 is disposed on a base member 111 of the HDD. Disk(s) 130 are mounted on spindle motor 100 and are rotated by spindle motor 100 at a predetermined angular velocity. Though the HDD of FIG. 1 may comprise more than one disk 130, for convenience of description, only one disk will be referred to herein, and it will be referred to as "disk 130".

Actuator 160 comprises an actuator pivot 165 disposed on base member 111, a swing arm 163, a suspension 162, and a coil-supporting portion 167. Swing arm 163 is rotatably connected to actuator pivot 165. Suspension 162 is connected to the tip of swing arm 163, supports read/write head 161, and motivates read/write head 161 toward the surface of disk 130. Read/write head 161 follows a target track "T" on disk 130 to read data from or write data to disk 130. When disk 130 stops rotating, read/write head 161 is positioned on a parking ramp 170 disposed outside the perimeter of disk 130.

In the illustrated example of FIG. 1, VCM 169 comprises a magnet 184 and a VCM coil 164. VCM 169 is adapted to supply rotary driving power to rotate swing arm 163 in a direction specified by Fleming's Left Hand Rule. This rotational movement is accomplished through an interaction of an input current with VCM coil 164 and a magnetic field formed by magnet 184. VCM coil 164 is fitted into coil-supporting portion 167 disposed at the base of swing arm 163. Magnet 184 typically surrounds VCM coil 164 and is attached to and supported by a yoke 181. In the illustrated example, spindle motor 100 and actuator 160 are disposed in an interior space disposed between base member 111 and a mating cover member 191.

Figure 2:
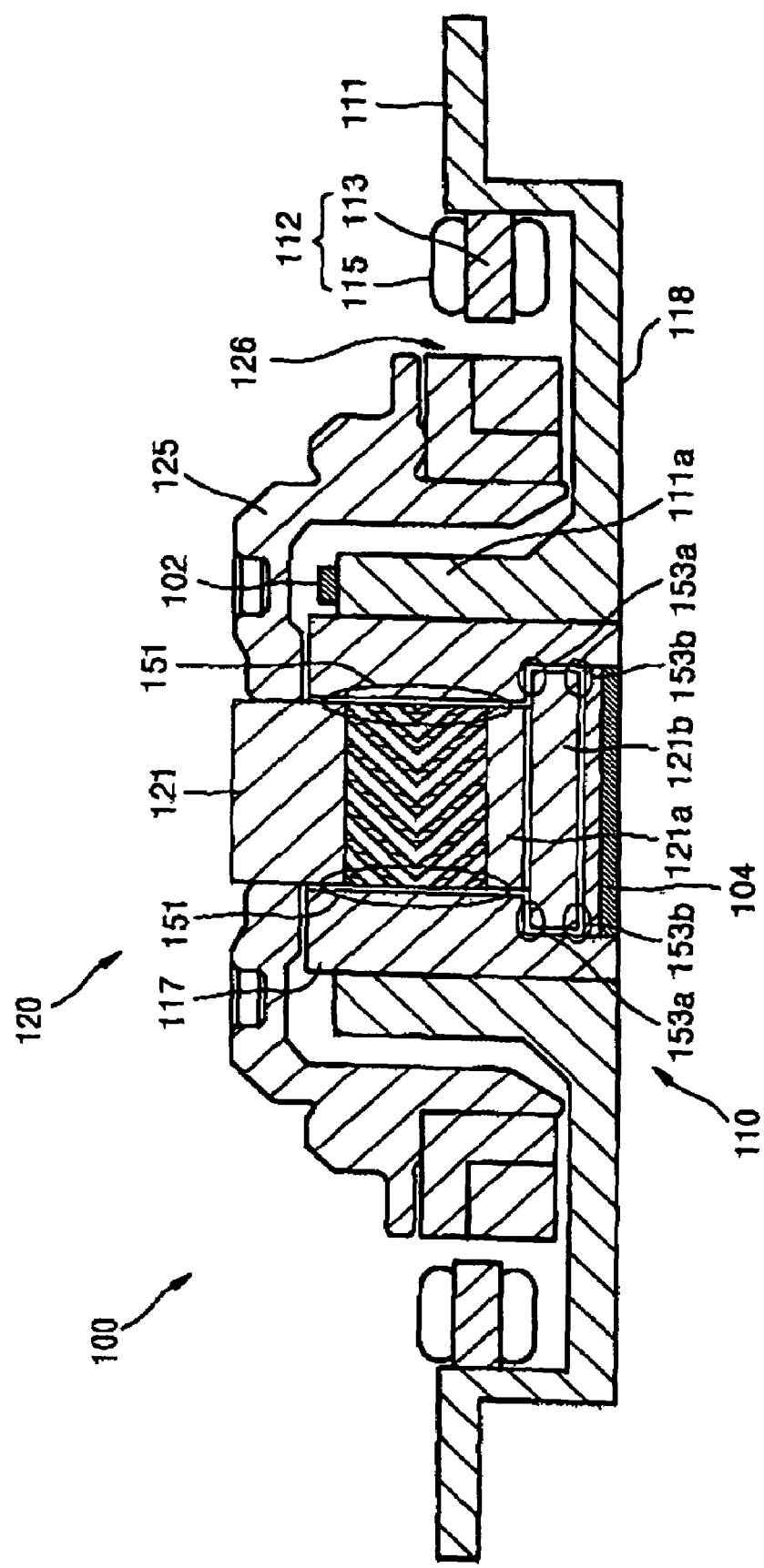
FIG. 2 is a cross-sectional view, taken along Line II-II of FIG. 1, of a spindle motor of the HDD of FIG. 1, in accordance with an embodiment of the invention.

FIG. 2 is a vertical cross-sectional view of spindle motor 100 shown in FIG. 1 in accordance with an embodiment of the invention. Referring to FIG. 2, spindle motor 100 comprises a shaft 121 defining a center of rotation for spindle motor 100, a hub 125 attached to and adapted to rotate with shaft 121, and a stator 112 attached to base member 111 and disposed outside of the perimeter of hub 125, such that stator 112 and a permanent magnet 126 attached to hub 125 are separated from but facing one another. Permanent magnet 126 is disposed at the outer edge of hub 125. Stator 112 is disposed facing permanent magnet 126 and in the illustrated example comprises a yoke 113 and a coil 115 wound around yoke 113. When the HDD operates, stator 112 is magnetized by a driving current and interacts with permanent magnet 126. A resulting magnetic force rotates hub 125 together with shaft 121.

Base member 111 comprises a neck portion 111a protruding upwards to support shaft 121. A sleeve 117 enclosing shaft 121 is inserted into an opening of neck portion 111a. Shaft 121 comprises a cylindrical journal portion 121a, and comprises a thrust portion 121b protruding radially from under a lower portion of shaft 121 in order to fix shaft 121 in sleeve 117 along an axis substantially parallel to the axis of rotation for shaft 121. The components of spindle motor 100 may be grouped into a rotary body 120 and a static body 110 adapted to support rotary body 120. In the illustrated embodiment of FIG. 2, rotary body 120 comprises shaft 121 and hub 125, while static body 110 comprises stator 112, base member 111, and sleeve 117.

Hydrodynamic bearings adapted to rotatably support shaft 121 are disposed around shaft 121. Among the hydrodynamic bearings are upper and lower thrust bearings 153a and 153b adapted to support shaft 121 axially (i.e., in a direction parallel to the axis of rotation for shaft 121) and a journal bearing 151 adapted to support shaft 121 radially (i.e., in a direction perpendicular to the axis of rotation for shaft 121). In addition, a comb-pattern groove is formed in the surface of shaft 121. Thus, as shaft 121 rotates, the comb-pattern groove generates radial hydrodynamic pressure. Alternatively, although not shown, a similar groove may be formed in the inner surface of sleeve 117 facing shaft 121.

Alternately or additionally, spindle motor 100 illustrated in FIG. 2 may comprise a flying height sensor 102, a static eccentricity sensor 104, and/or an a rotation speed sensor 106. In the context of the embodiment shown in FIG. 2, the various sensors are shown conceptually for clarity of illustration. The actual positioning of these sensors in relation to the components of spindle motor 100 may vary with multiple design parameters.

Figure 3:
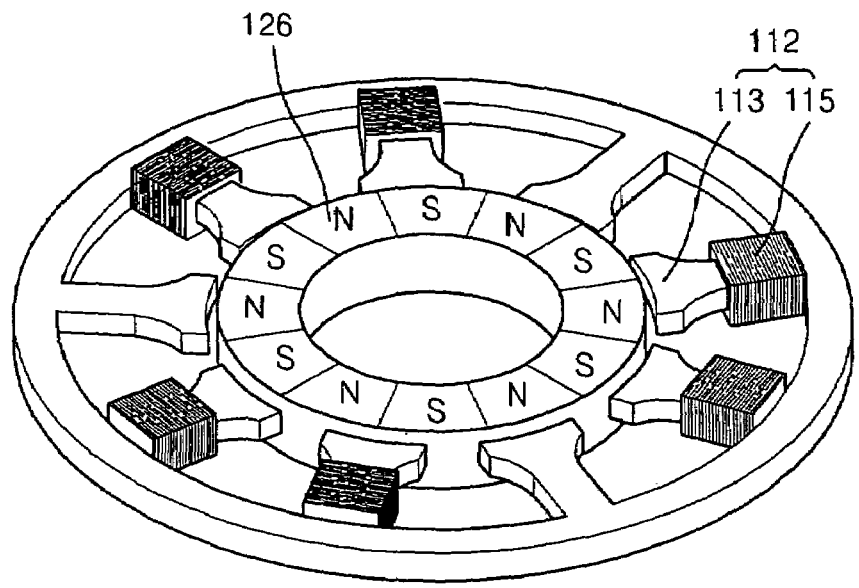
FIG. 3 is a perspective view of the structure of a permanent magnet and a portion of a static body of FIG. 2.

FIG. 3 further illustrates in one embodiment an exemplary structure for permanent magnet 126. (See, FIG. 2). In the illustrated example, permanent magnet 126 is circular and comprises twelve poles. In addition, a first plurality of yokes 113 (e.g., nine in the illustrated example) are arranged in a circle around permanent magnet 126. Yokes 113 extend from a ring-shaped supporting rim, and a coil 115 is wound around a second plurality of (e.g., six of nine) yokes 113. The second plurality of yokes 113 including a coil 115 are divided into pairs of adjacent yokes 113 with a coil-less yoke from the first plurality of yokes being positioned between each pair. In one example assuming the use of a brushless DC motor, yokes 113 of stator 112 are alternately assigned opposite magnetic polarities by applying appropriate AC current signals to respective coils 115.

Figure 4:
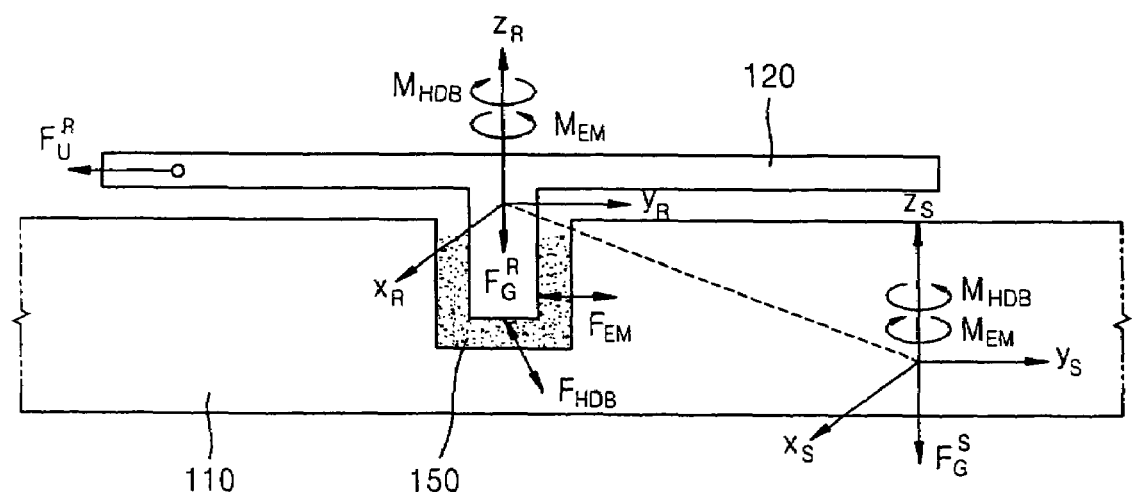
FIG. 4 shows forces acting on a static body and a rotary body in the spindle motor of FIG. 2, and the moment of the forces.

With the foregoing structural embodiments in mind, a method of detecting free-fall for an HDD in accordance with an embodiment of the invention will now be described. FIG. 4 illustrates various forces (and related moments) typically acting on static body 110 and rotary body 120 in spindle motor 100. Referring to FIG. 4, a coordinate system comprising orthogonal directions $x_S$, $y_S$, and $z_S$ is defined with respect to static body 110 for ease of reference. Additionally, a relative coordinate system comprising orthogonal directions $x^R$, $y^R$, and $z_R$ is defined with respect to rotary body 120. Lubricating oil fills the bearing clearance between static body 110 and rotary body 120.

Within this descriptive context, static body 110 experiences a force $F_G^S$ (i.e., has a weight $F_G^S$) due to gravity, a reactive force $F_{HDB}$ from hydrodynamic bearing 150, and an unbalanced electromagnetic force $F_{EM}$.

Rotary body 120 experiences a force $F_G^R$ (i.e., has a weight $F_G^R$) due to gravity, a centrifugal force $F_U^R$ caused by the eccentric mass distribution in shaft 121, the reactive force $F_{HDB}$ from hydrodynamic bearing 150, and the unbalanced electromagnetic force $F_{EM}$. The reactive force $F_{HDB}$ from hydrodynamic bearing 150 and the unbalanced electromagnetic force $F_{EM}$ applied to static body 110 and rotary body 120 have an action/reaction relationship, and thus act in opposite directions. The electromagnetic torque $M_{EM}$ driving rotary body 120 acts on (i.e., is a moment applied to) rotary body 120 in the rotational direction of rotary body 120, and the friction torque $M_{HDB}$ caused by friction between hydrodynamic bearing 150 and static body 110 also acts on static body 110 in the same rotational direction. Similarly, the electromagnetic torque $M_{EM}$ caused by the rotational driving power and the friction torque $M_{HDB}$ of the bearing are each applied to rotary body 120. The resultant forces and moments acting on each of static body 110 and rotary body 120 are defined by Equation (1) below in accordance with the Newton-Euler Equation:

$$\sum F_i^S = F_G^S - F_{HDB} - F_{EM}$$

$$\sum M_{\theta_i}^S = M_{HDB}^S - M_{EM}$$

$$\sum F_i^R = F_G^R + F_U^R + F_{HDB} + F_{EM}$$

$$\sum M_{\theta_i}^R = M_{HDB}^R + M_U^R + M_{EM}$$

$$(i = x, y, z)$$

Equation (1)

wherein $F_G$, $F_{HDB}$, $F_{EM}$, $F_U$, $M_{EM}$, $M_{HDB}$ indicate the force of gravity, the reactive force of hydrodynamic bearing 150, the unbalanced electromagnetic force, the centrifugal force generated by the unbalanced mass of rotary body 120, the electromagnetic torque, and the friction torque of hydrodynamic bearing 150, respectively. In addition, the superscripts "S" and "R" are used to indicate the force or moment acting on static body 110 and rotary body 120, respectively.

The displacement of rotary body 120 from its initial position with respect to static body 110 during time $\Delta t$ may be obtained by performing numerical integration with respect to time on the Newton-Euler Equation using, for example, the Runge-Kutta Algorithm. It is possible to obtain the position and orientation of rotary body 120 after a certain time by inputting the new position of rotary body 120 on the basis of the obtained results and repeating the integration with respect to time. However, the other forces or moments, except for the weight $F_G^S$ of static body 110 and the weight $F_G^R$ of rotary body 120, may be obtained from an analysis of the lubricating oil using the Reynolds Equation and an analysis of the electromagnetic field using Maxwell's Equation, which will be described below. Thus, the Newton-Euler Equation, the Reynolds Equation, and the Maxwell Equation will be integrated in the working example.

The reactive force $F_{HDB}$ from hydrodynamic bearing 150 and the friction torque $M_{HDB}$ of hydrodynamic bearing 150 may be obtained using finite element analysis of the lubricating oil disposed between static body 110 and rotary body 120. Use of the Reynolds Equation is one approach to this finite element analysis and may be represented by Equations (2) and (3) below. Equation 2 and Equation 3 thus represent governing equations for the lubricating oil as applied to journal bearing 151 and a thrust bearing, respectively, and are expressed in cylindrical coordinates using variables (r, θ, z).

$$\frac{\partial}{R\partial\Theta}\left(\frac{h^3}{12\mu}\frac{\partial p}{R\partial\Theta}\right)+\frac{\partial}{\partial z}\left(\frac{h^3}{12\mu}\frac{\partial p}{\partial z}\right)=\frac{\dot{\theta}_z}{2}\frac{\partial h}{\partial\Theta}+\frac{\partial h}{\partial t} \quad \text{Equation (2)}$$

$$\frac{1}{r}\frac{\partial}{\partial r}\left(r\frac{h^3}{12\mu}\frac{\partial p}{\partial r}\right)+\frac{\partial}{r\partial\Theta}\left(\frac{h^3}{12\mu}\frac{\partial p}{r\partial\Theta}\right)=\frac{r\dot{\theta}_z}{2}\frac{\partial h}{r\partial\Theta}+\frac{\partial h}{\partial t} \quad \text{Equation (3)}$$

wherein h, p, μ, and R represent the thickness of the lubricating oil film, the pressure generated from the lubricating oil film, the viscosity of the lubricating oil, and the radius of the journal bearing, respectively.

Figure 5:
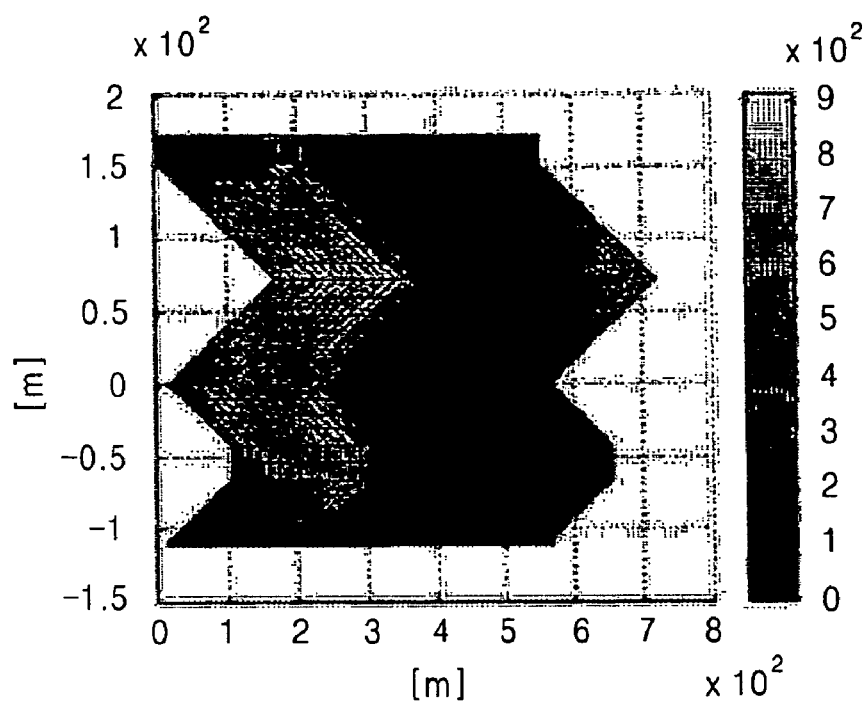
FIGS. 5 and 6 respectively show the pressure distribution of a journal bearing and a thrust bearing of the spindle motor.
Figure 6:
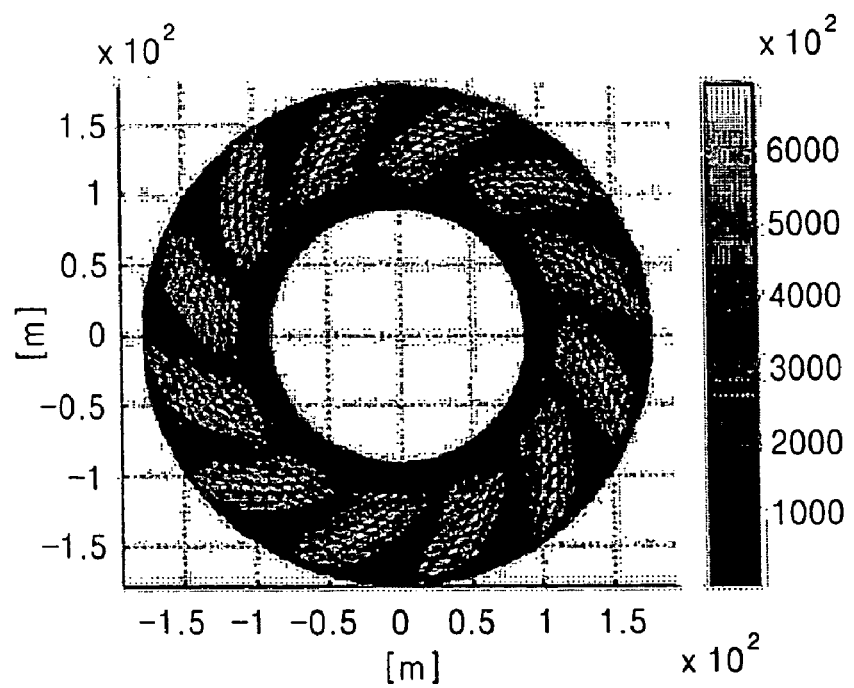

As rotary body 120 rotates, the hydrodynamic pressure of the lubricating oil is generated between rotary body 120 and static body 110, and the distribution of the hydrodynamic pressure is obtained by developing a finite element from the Reynolds Equation. The reactive force $F_{HDB}$ and friction torque $M_{HDB}$ Of hydrodynamic bearing 150 are obtained by integrating the pressure and the shear stress of the lubricating fluid, through the pertinent region. FIGS. 5 and 6 respectively show the pressure distribution of the journal bearing and the pressure distribution of the thrust bearing over time.

The electromagnetic torque $M_{EM}$ and the unbalanced electromagnetic force $F_{EM}$ of Equation (1) may be obtained by analyzing a voltage equation with respect to the driving circuit of spindle motor 100 using Equation (4) and Maxwell's Equation with respect to the electromagnetic field using Equation (5).

$$R_i I_i + L_i \frac{dI_i}{dt} + \frac{d\phi_i}{dt} - R_j I_j - L_j \frac{dI_j}{dt} - \frac{d\phi_j}{dt} = V_S \quad \text{[Formula 4]}$$

(Duty On)

$$R_i I_i + L_i \frac{dI_i}{dt} + \frac{d\phi_i}{dt} - R_j I_j - L_j \frac{dI_j}{dt} - \frac{d\phi_j}{dt} = -V_D$$

(Duty Off)

$$I_i + I_j + I_k = 0$$

(i, j, k:phase index)

$$\frac{\partial}{\partial x}\left(v\frac{\partial A_z}{\partial x}\right)+\frac{\partial}{\partial y}\left(v\frac{\partial A_z}{\partial y}\right)=J-v\left(\frac{\partial M_y}{\partial x}-\frac{\partial M_x}{\partial y}\right) \quad \text{[Formula 5]}$$

wherein v, J, Az, and M represent resistivity (which is the reciprocal of permeability), the density of a current flowing into spindle motor 100, the magnetic vector potential, and the magnetization of the permanent magnet, respectively.

Figure 7:
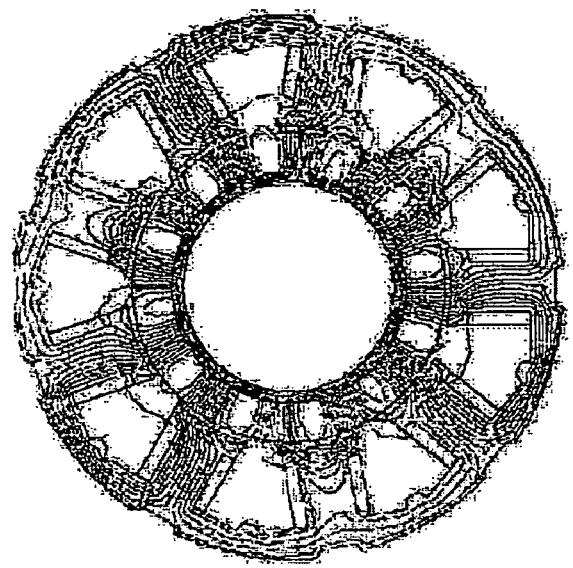
FIG. 7 shows the magnetic flux distribution of the permanent magnet and the static body in the spindle motor.
Figure 8:
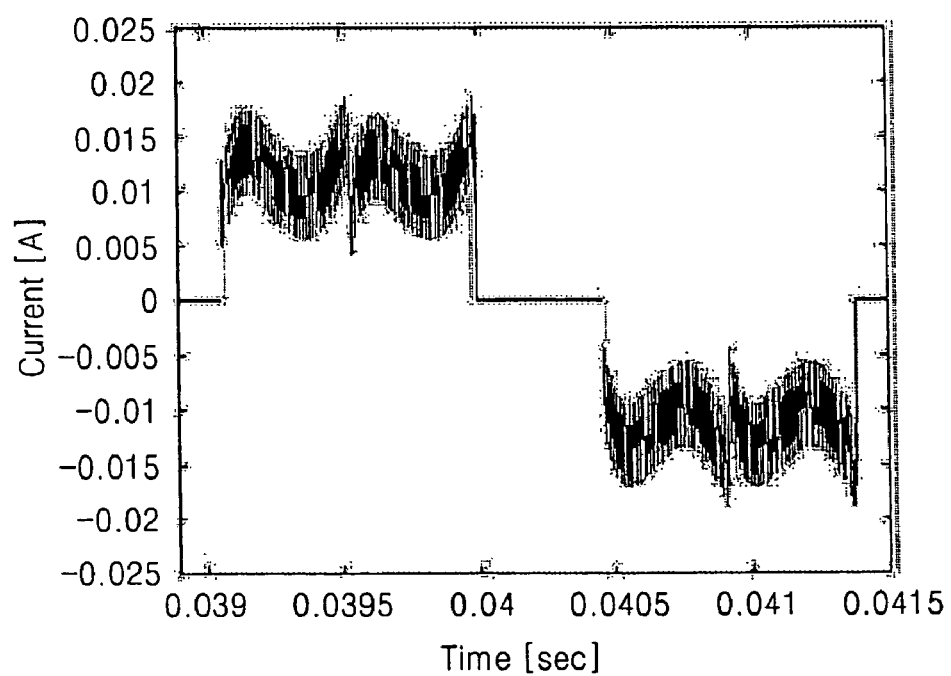
FIG. 8 shows an example of a driving signal input to the spindle motor.

FIGS. 7 and 8 show the results of the electromagnetic analysis described above. FIG. 7 illustrates the distribution of the magnetic flux of spindle motor 100, and FIG. 8 illustrates the waveform of the driving current input to spindle motor 100 to rotate spindle motor 100 at constant speed.

Figure 9:
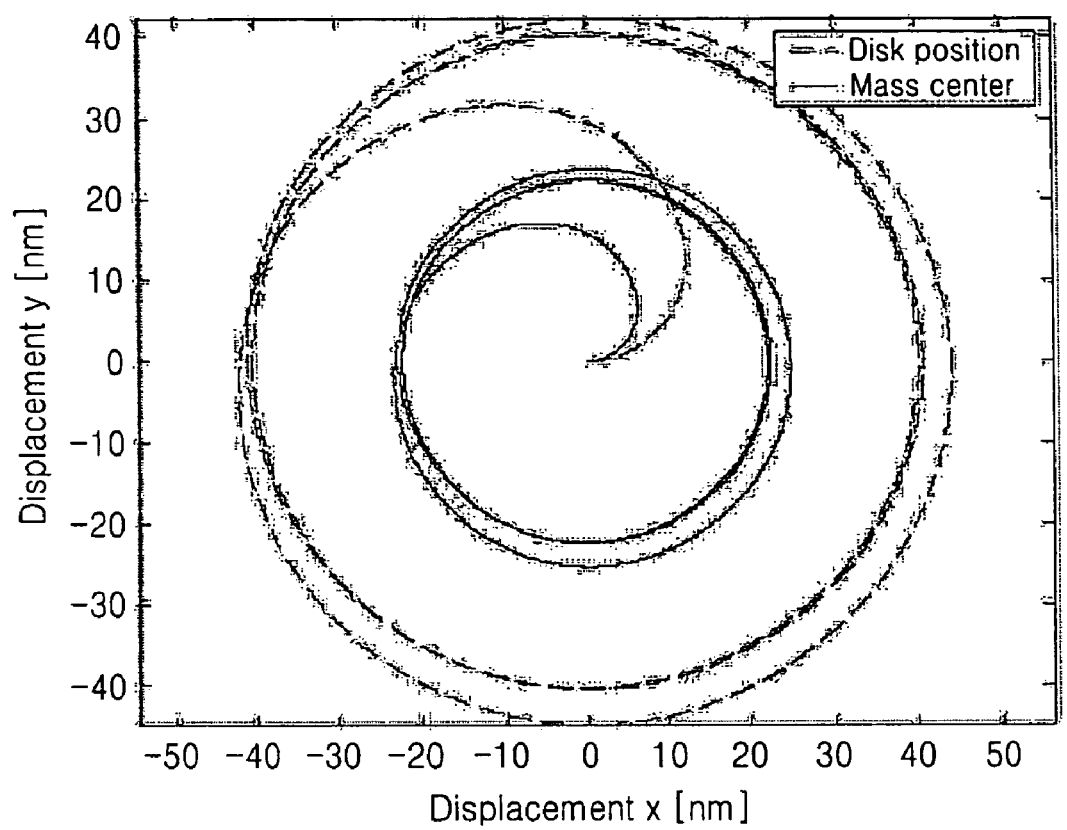
FIG. 9 is a graph of paths of the centroid and the center of mass of the rotary body in the spindle motor.

FIG. 9 is a graph illustrating paths of a centroid and center of mass for rotary body 120, as obtained from the aforementioned analysis. In FIG. 9, a dotted line represents the path of rotary body's 120 centroid. Upon initial operation of spindle motor 100, its centroid has a displacement of "0" in each of the x and y directions (i.e., it is disposed at the origin (0,0)). However, as spindle motor 100 is driven, its centroid becomes offset from the origin (i.e., becomes eccentric), as indicated by the spiral path. The solid line in FIG. 9 represents the path of rotary body's 120 center of mass. The center of mass and the centroid of rotary body 120 have similar, but not identical paths.

FIGS. 10 through 14 show the results of numerical integration with respect to time of Equations (1) through (4), respectively, when an HDD enters a free-fall state. The illustrated example assume a horizontal orientation for the HDD wherein a bottom surface 118 of static body 110 (see, e.g., FIG. 2) is oriented substantially in parallel with the ground, such that static body 110 is disposed below rotary body 120.

Figure 10:
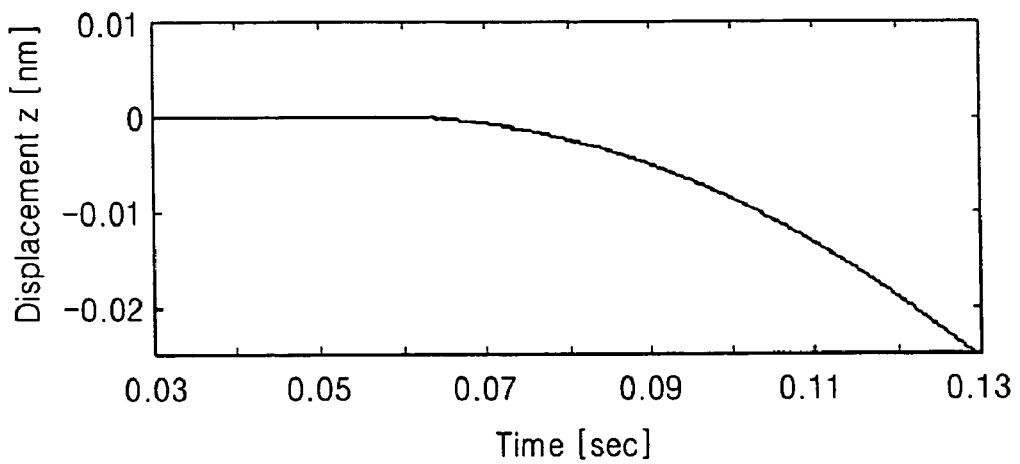
FIGS. 10 through 14 show the results of numerical Integration by Finite Element Analysis.
Figure 11:
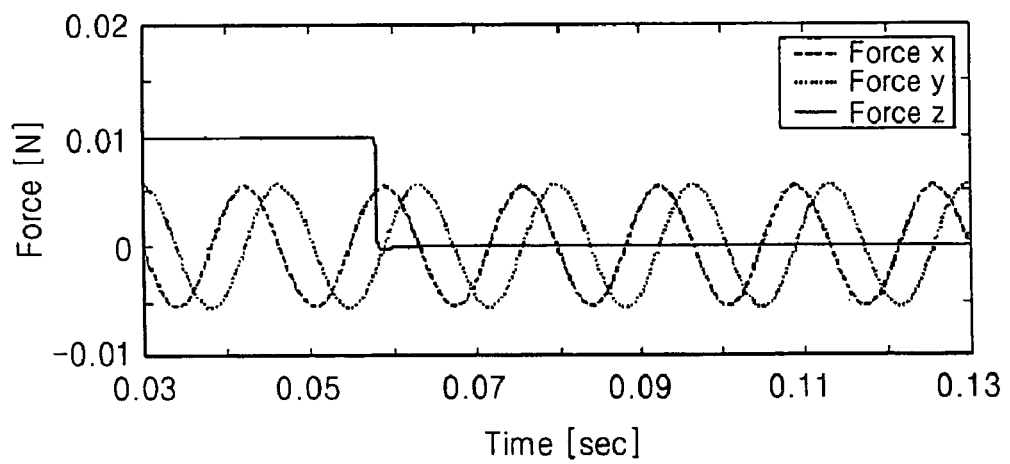

In FIGS. 10 through 14, the x, y, and z, axes correspond to the coordinate system previously established for static body 110 and shown in FIG. 4. That is, the directions x, y, and z correspond to $x_S$, $y_S$, and $z_S$ of FIG. 4, respectively. FIG. 10 illustrates the displacement of an HDD in a gravitational direction (i.e., displacement along the z-axis under the working assumptions) with respect to time, wherein the HDD begins to fall at about 0.06 sec. FIG. 11 illustrates the resultant component forces acting on rotary body 120 in each of the x-, y-, and z-directions, excluding the force of gravity. The component forces acting on rotary body 120 in the x- and y-directions oscillate as sine waves each having a regular period. The component force in the z-direction (i.e., in the direction of gravity), which normally remains at about 0.01N, suddenly drops to zero when the HDD begins to fall. It is known that the component force in the z-direction is instantaneously removed when a fall begins. This is because, when the HDD falls, the rotary body 120 will no longer exert its weight on the hydrodynamic bearing, and the axial supporting force that countered the weight of rotary body 120 before the fall will drop to zero once the hydrodynamic bearing has pushed rotary body 120 upward with respect to static body 110 during the fall.

Figure 12:
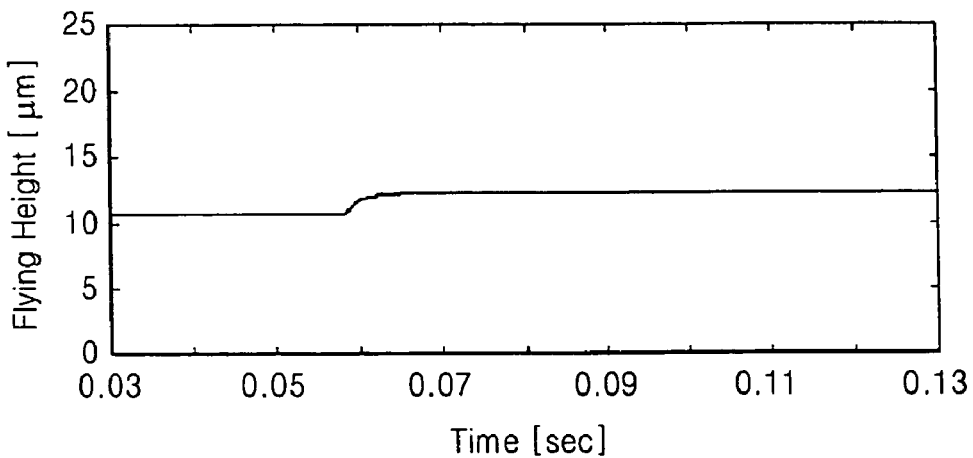

FIG. 12 illustrates change in the flying height of rotary body 120 (i.e., change in the distance separating rotary body 120 from static body 110) with respect to time. The flying height increases by about 1.6 μm when the fall begins. As the flying height between rotary body 120 and static body 110 suddenly increases, the bearing clearance between static body 110 and rotary body 120 suddenly changes, and the friction torque exerted by some of hydrodynamic bearing 150 changes, as described below.

Figure 13:
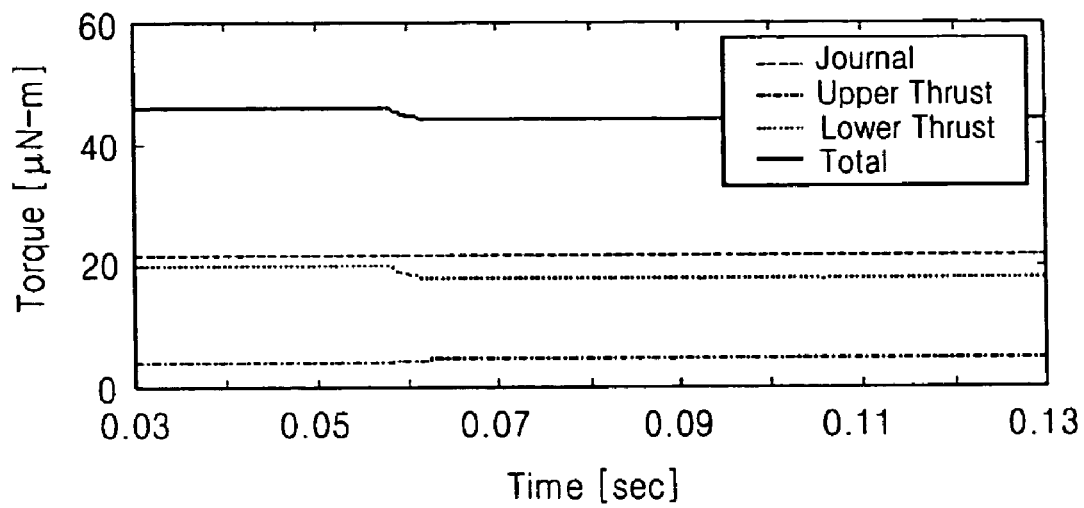

FIG. 13 shows the change in friction torque with respect to time for the upper and lower thrust bearings and the journal bearing, each of which is acting on rotary body 120. While the friction torque exerted by the journal bearing stays constant before and after the fall begins, the friction torque exerted by the upper thrust bearing increases slightly after the fall begins, and the friction torque exerted by the lower thrust bearing clearly decreases after the fall begins. Accordingly, after the fall starts, the total friction torque, which is the sum of the friction torque exerted by the journal bearing and the upper and lower thrust bearings, decreases by about 4.4%. The total friction torque exerted by the thrust bearings decreases because the upper and lower bearing clearances between rotary body 120 and static body 110 change as the flying height between rotary body 120 and static body 110 suddenly increases when the HDD begins to fall, as described with reference to FIG. 12. The friction torque exerted by hydrodynamic bearing 150 acts as a kind of rotation load to keep spindle motor 100 rotating at a constant speed. When the HDD falls, the friction torque suddenly decreases, so the driving current of spindle motor 100 must also decrease in order to keep spindle motor 100 rotating at a constant speed.

Figure 14:
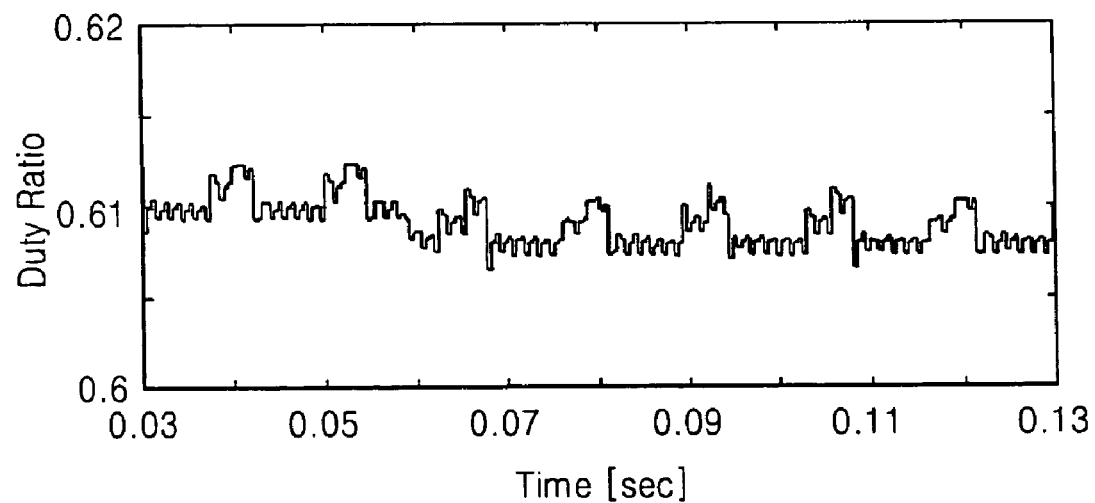

FIG. 14 shows the change in the pulse width modulation (PWM) duty ratio of the driving signal for spindle motor 100 with respect to time. The PWM duty ratio oscillates between a low level and a high level. When the HDD falls, the high level and the low level each decrease by about 0.2% and the friction torque decreases as shown in FIG. 13. Consequently, even though a lower driving current is applied to spindle motor 100, it rotates at a constant speed, which results in the decrease of the PWM duty ratio.

Figure 15:
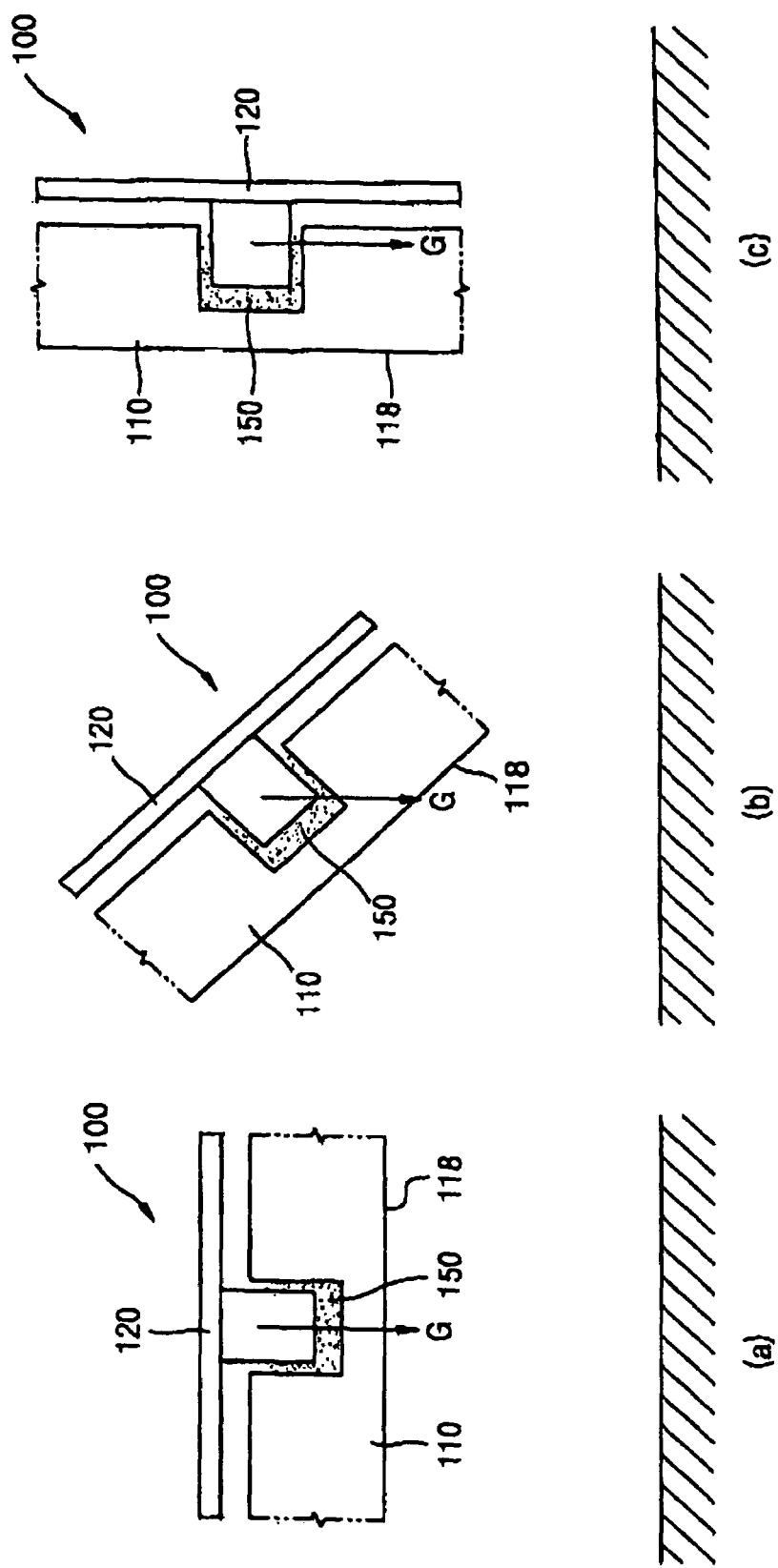
FIG. 15 shows typical orientations with which the spindle motor 100 may fall.

FIG. 15 illustrates three more specific examples of spindle motor 100 in a free-fall state, each with spindle motor 100 in a different spatial orientation. Example (a) of FIG. 15 shows spindle motor 100 falling in a horizontal orientation, as described above. Example (c) of FIG. 15 shows spindle motor 100 falling in a vertical orientation, an orientation in which bottom surface 118 of static body 110 is substantially perpendicular to the ground. Example (b) of FIG. 15 shows spindle motor 100 falling in an oblique orientation between the horizontal and vertical orientations. The specific orientation shown in example (c) has bottom surface 118 of static body 110 oriented at a 45 degrees to the ground as spindle motor 100 falls. The term "oblique orientation" will be used herein to refer this particular example.

In FIG. 15, each arrow G indicates the directional pull of gravity relative to the falling HDD. It is further assumed for purposed of this explanation that when the HDD has a particular orientation, spindle motor 100 also has this orientation, and vice versa. In accordance with embodiments of the invention, system variables in an HDD are measured in order to detect a free-fall state. For each of the system variables used to detect an HDD free-fall state, the change in a system variable that occurs when the HDD is a free-fall state will differ in accordance with the HDD's orientation, as will be described below in some additional detail.

When spindle motor 100 has a horizontal orientation, but is not falling, lower thrust bearing 153b supports the weight of rotary body 120 (see, e.g., FIG. 2). When the HDD begins to fall with a horizontal orientation, the gravitational force exerted by rotary body 120 on lower thrust bearing 153b is removed. As a result, the separation distance between rotary body 120 and static body 110 (i.e., the flying height) increases. Thus, a free-fall state for the HDD may be detected by detecting a material change in the flying height of rotary body 120.

Figure 16A:
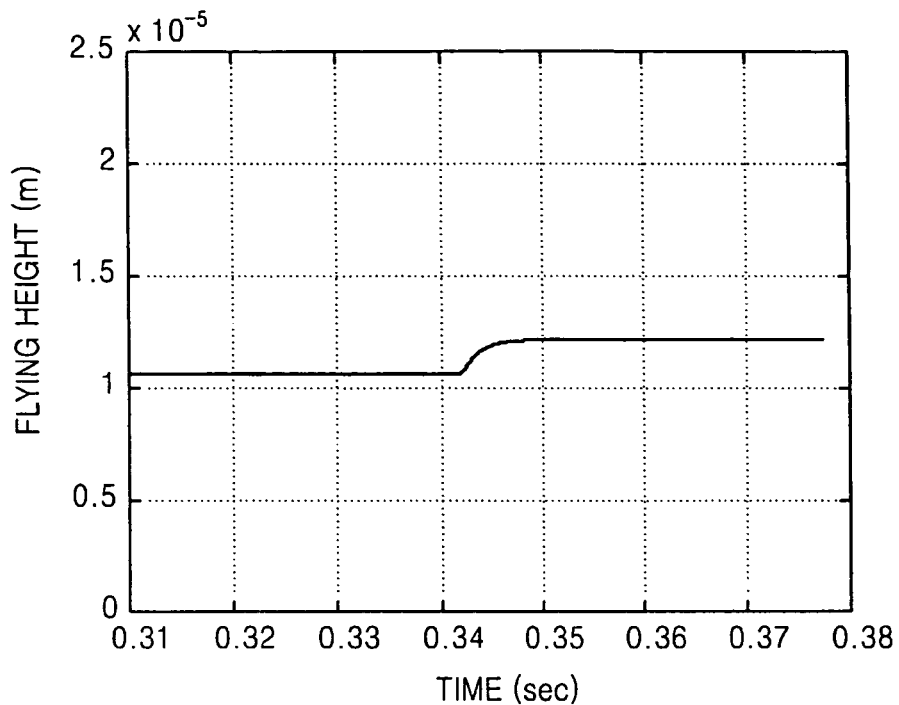
FIGS. 16A through 16C show change in the flying height in accordance with the orientation with which the spindle motor falls.
Figure 16B:
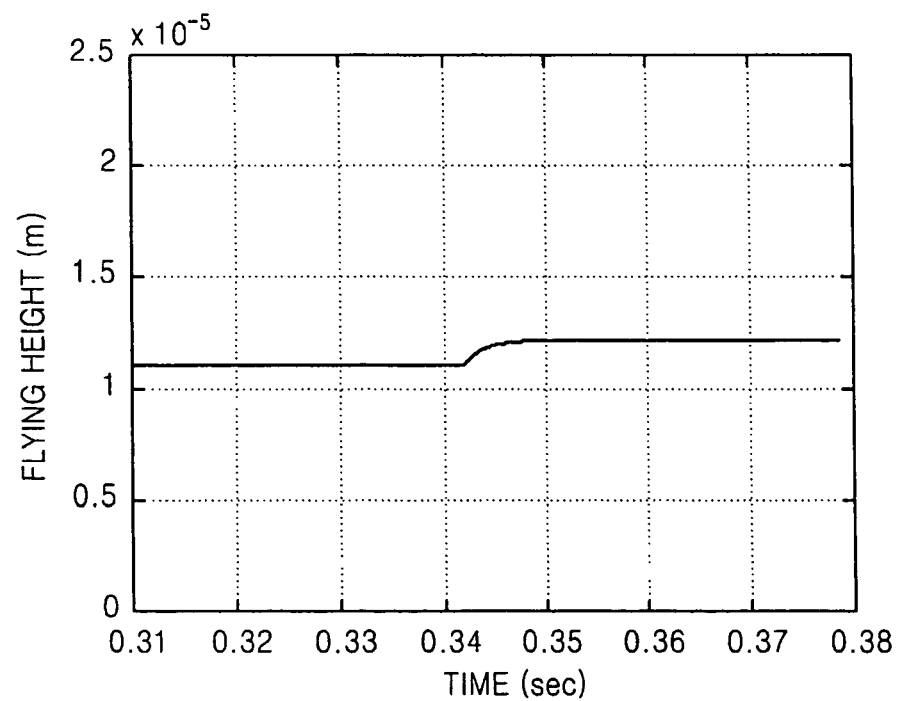
Figure 16C:
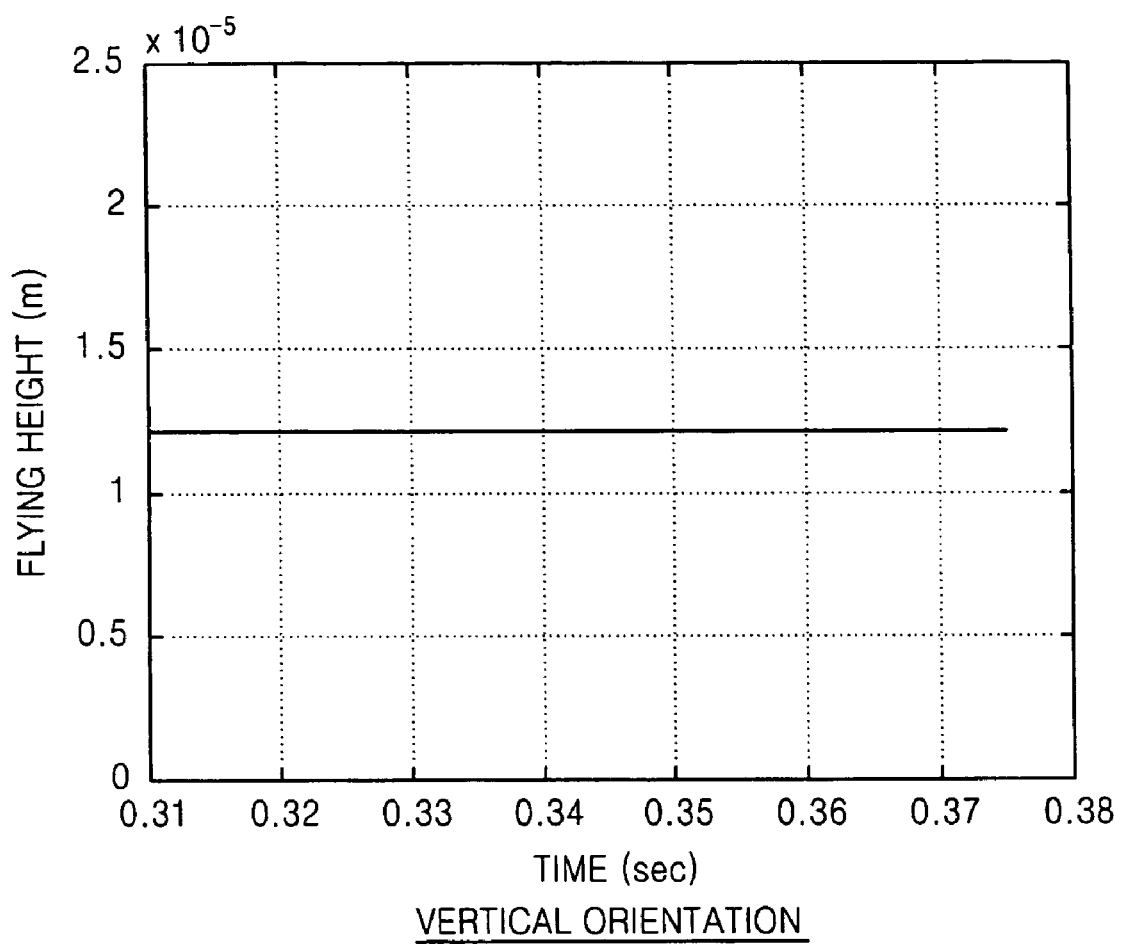

In the embodiment illustrated in FIG. 2, material changes in the flying height may be detected in real time using a flying height sensor 102. FIGS. 16A through 16C illustrate detected changes in flying height in accordance with the three exemplary orientations of FIG. 15. The nature of the changes in flying height shown in FIGS. 16A through 16C are further described in Table 1. The angle θx represents the angle between bottom surface 118 of spindle motor 100 and a horizontal plane substantially parallel with the ground. When the HDD falls with a horizontal orientation, θx=0°; when the HDD falls with a vertical orientation, θx=90°; and when the HDD falls with an oblique orientation, θx=45°.

TABLE 1

| Fall Orientation | Before Fall | After Fall has Begun | Variation in Flying Height |
|---|---|---|---|
| θx = 0° | 10.61 (μm) | 12.18 (μm) | 12.9 (%) |
| θx = 45° | 11.05 (μm) | 12.18 (μm) | 9.3 (%) |
| θx = 90° | 12.18 (μm) | 12.18 (μm) | 0.0 (%) |

Of further note, when spindle motor 100 is resting at an oblique orientation, both lower thrust bearing 153b and journal bearing 151 support the weight of rotary body 120 (see, e.g., FIG. 2). The proportion of rotary body's 120 weight supported by each bearings will vary in accordance with the angle θx. For example, when spindle motor 100 is resting at an oblique orientation of 45°, lower thrust bearing 153b and journal bearing 151 support the weight of rotary body 120 equally, so only a portion of this weight is exerted against lower thrust bearing 153b, and the reactive force of lower thrust bearing 153b reacts against (i.e., supports) only the portion of weight, as opposed to the entire weight, which is exerted against lower thrust bearing 153b when spindle motor 100 is resting at the horizontal orientation. Thus, although the flying height of rotary body 120 changes when spindle motor 100 falls at an oblique orientation, as shown in Table 1, when spindle motor 100 falls in an oblique orientation after first resting in an oblique orientation, the flying height will change less than when spindle motor 100 falls in the horizontal orientation after resting in the horizontal orientation. That is, a greater proportion of rotary body's 120 weight is exerted against lower thrust bearing 153b when spindle motor 100 is at rest in the horizontal orientation, as compared to when spindle motor 100 is at rest in an oblique orientation. So, at a point after spindle motor 100 begins to fall when the weight of rotary body 120 (or portion thereof) is no longer exerted against lower thrust bearing 153b, less weight has been removed from lower thrust bearing 153b when spindle motor 100 falls in an oblique orientation than when it falls in the horizontal orientation. Thus, the flying height will change less when the spindle motor 100 falls in an oblique orientation than in the horizontal orientation.

Figure 17A:
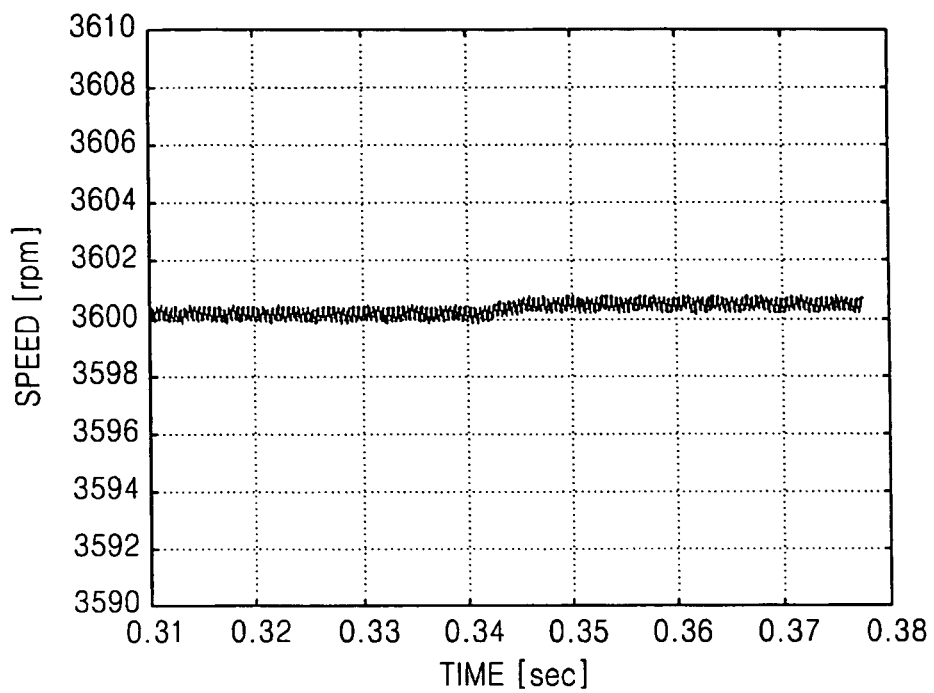
FIGS. 17A through 17C show change in the rotation speed in accordance with the orientation with which the spindle motor falls.
Figure 17B:
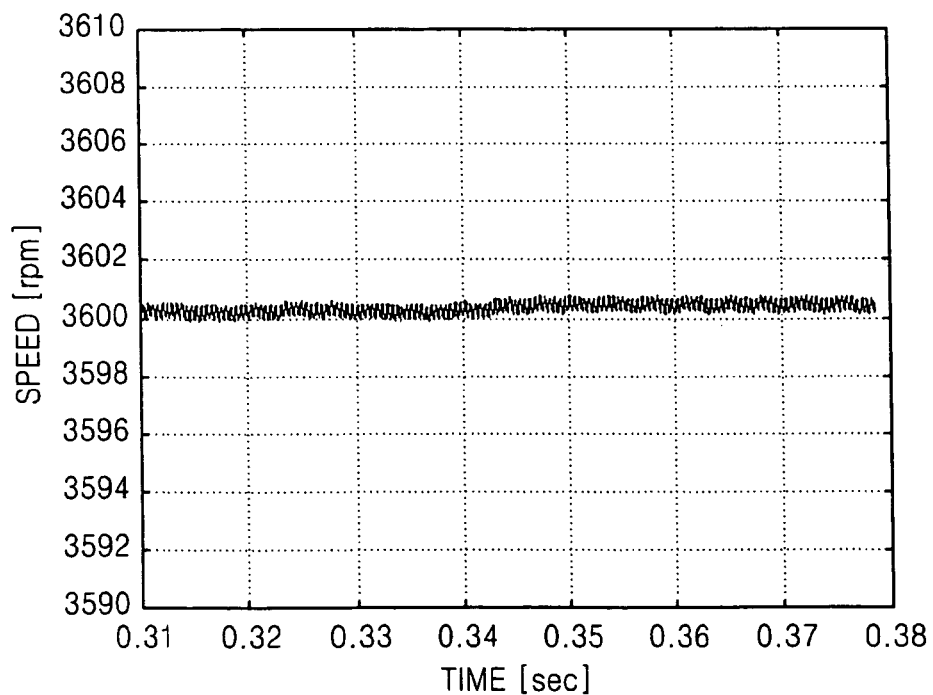
Figure 17C:
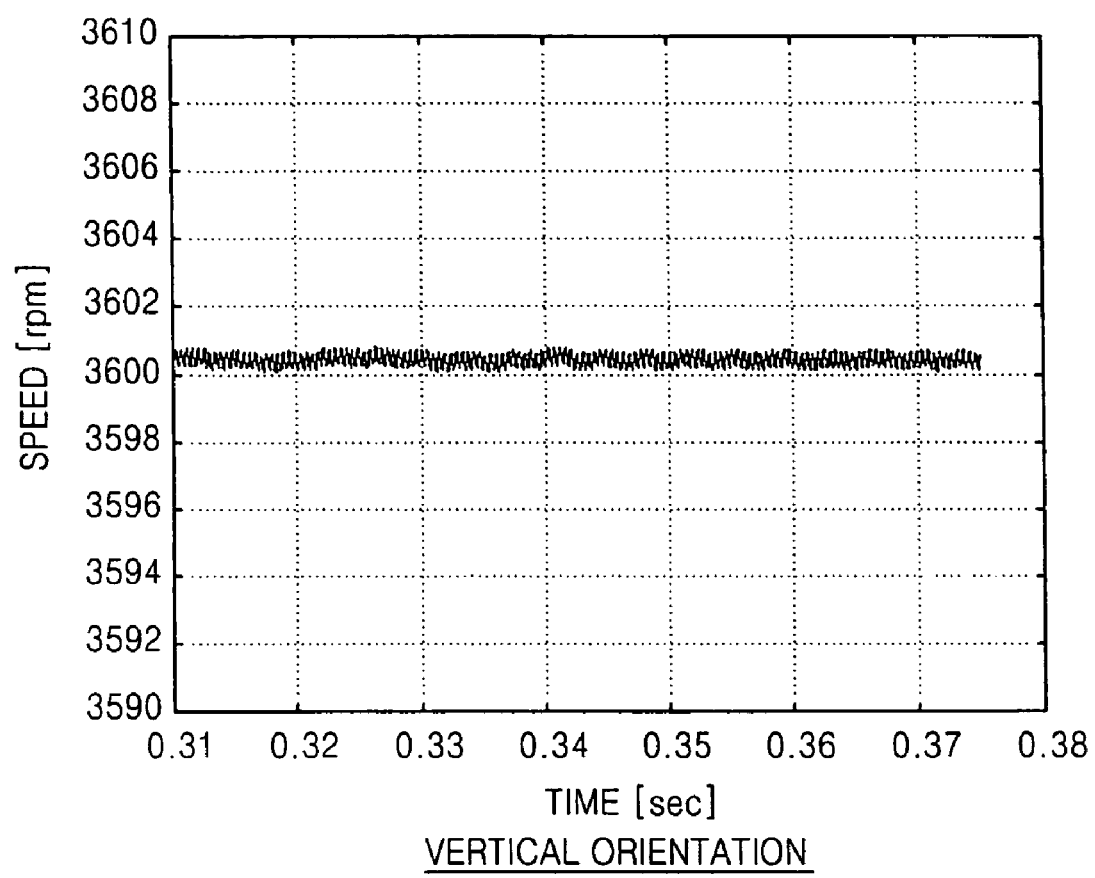

FIGS. 17A through 17C respectively show the rotation speed of spindle motor 100 before and after an HDD comprising spindle motor 100 begins to fall. When the HDD is falling in the horizontal orientation, the friction torque exerted by lower thrust bearing 153b supporting the weight of rotary body 120 decreases when the HDD begins to fall. Thus, the rotation speed of spindle motor 100 increases when the HDD begins fall. (See, e.g., time=0.3418 seconds in FIG. 17A).

In contrast, when the HDD falls in the vertical orientation, the rotation speed of spindle motor 100 remains about the same both before and after the HDD begins to fall. This result arises from the fact that the friction torque exerted by the thrust bearing in this orientation is about the same whether or not the HDD is falling.

When the HDD falls in an oblique orientation, the rotation speed changes, but the change is less than the change that occurs when the HDD falls in the horizontal orientation. Changes in the rotation speed of spindle motor 100 arising during a free-fall state for HDD may be detected by a feedback control loop 300 within the HDD. (See FIG. 23, discussed hereafter). Feedback control loop 300 is adapted to reduce the driving current provided to spindle motor 100 to thereby return spindle motor 100 to a defined rotation speed by, for example, lowering the PWM duty ratio of the driving signal.

Figure 23:
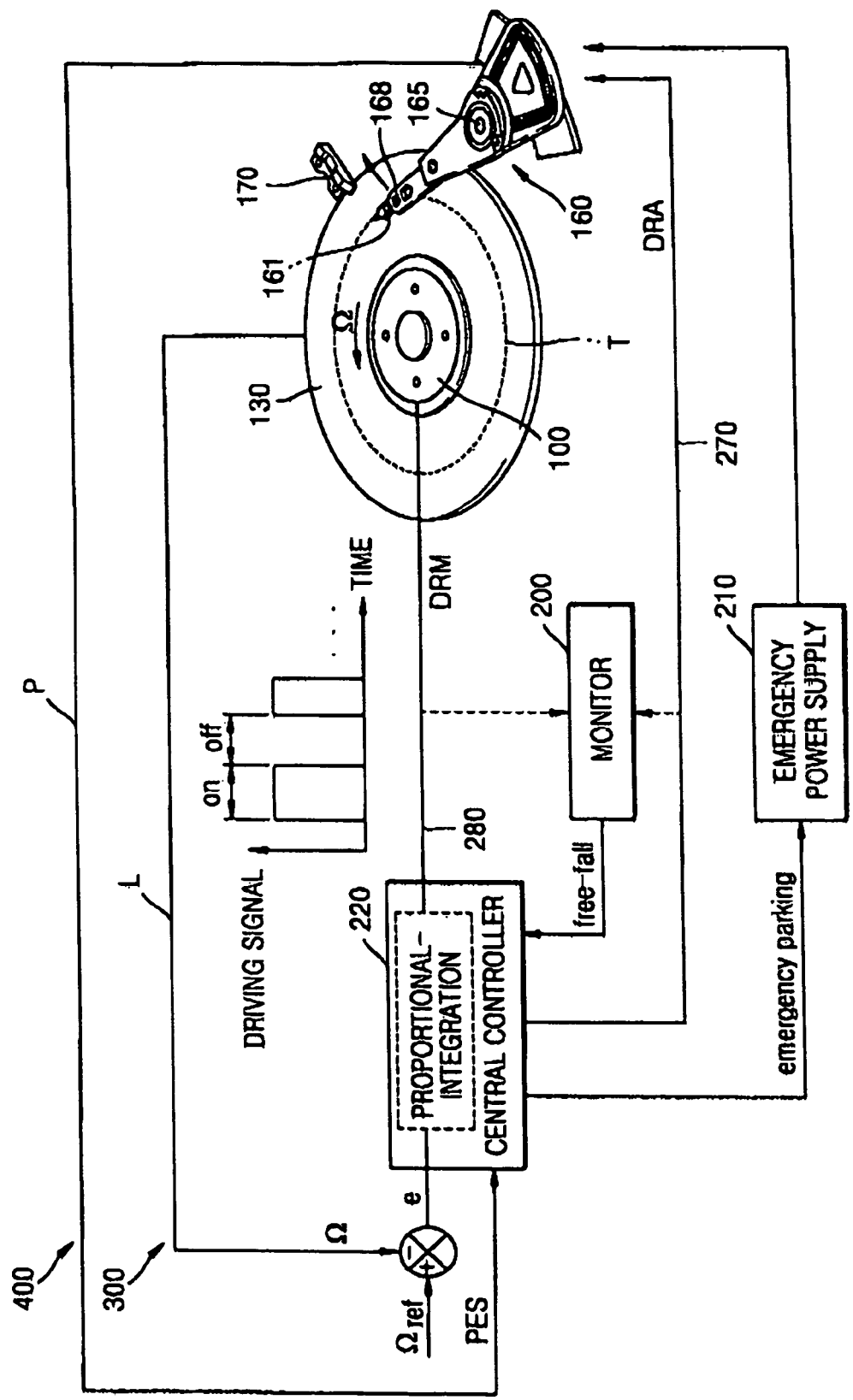
FIG. 23 is a schematic view of the structure of the HDD in accordance with an embodiment of the invention; and, FIG. 24 is a timing diagram of internal signals generated in the HDD of FIG. 23 while the HDD falls.

As shown in the embodiment illustrated in FIG. 2, a rotation speed sensor 106 may be variously associated with spindle motor 100 to measure the rotation speed of spindle motor 100 in real time. Referring for the moment to FIG. 23, in accordance with an embodiment of the invention, a monitor 200 may be adapted to measure the rotation speed Ω of spindle motor 100 and generate a corresponding free-fall signal when monitor 200 determines that the HDD is in a free-fall state. Monitor 200 may determine that the HDD is in a free-fall state in relation to a material (e.g., above a defined threshold) increase in the measured rotation speed.

Figure 18A:
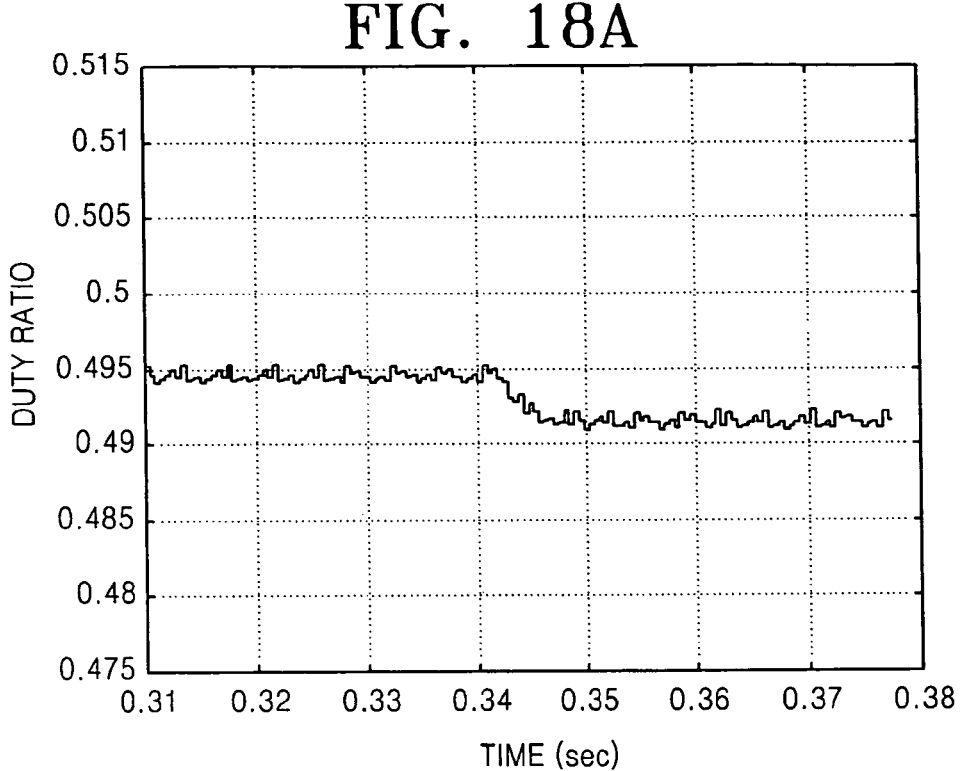
FIGS. 18A through 18C show change in the PWM duty-ratio of a driving signal applied to the spindle motor in accordance with the orientation with which the spindle motor falls.
Figure 18B:
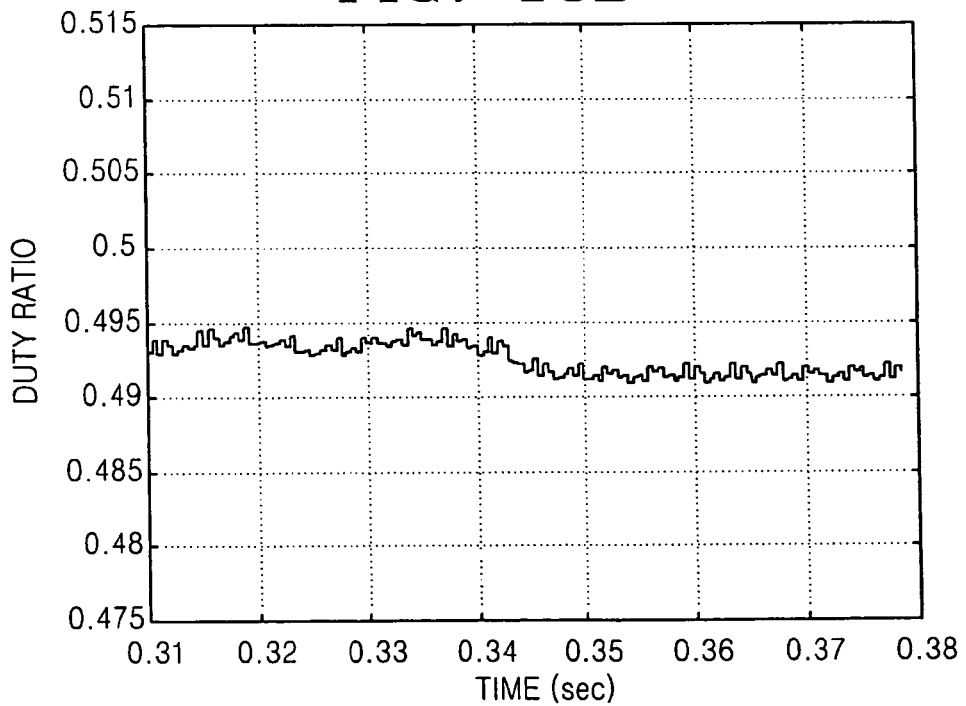
Figure 18C:
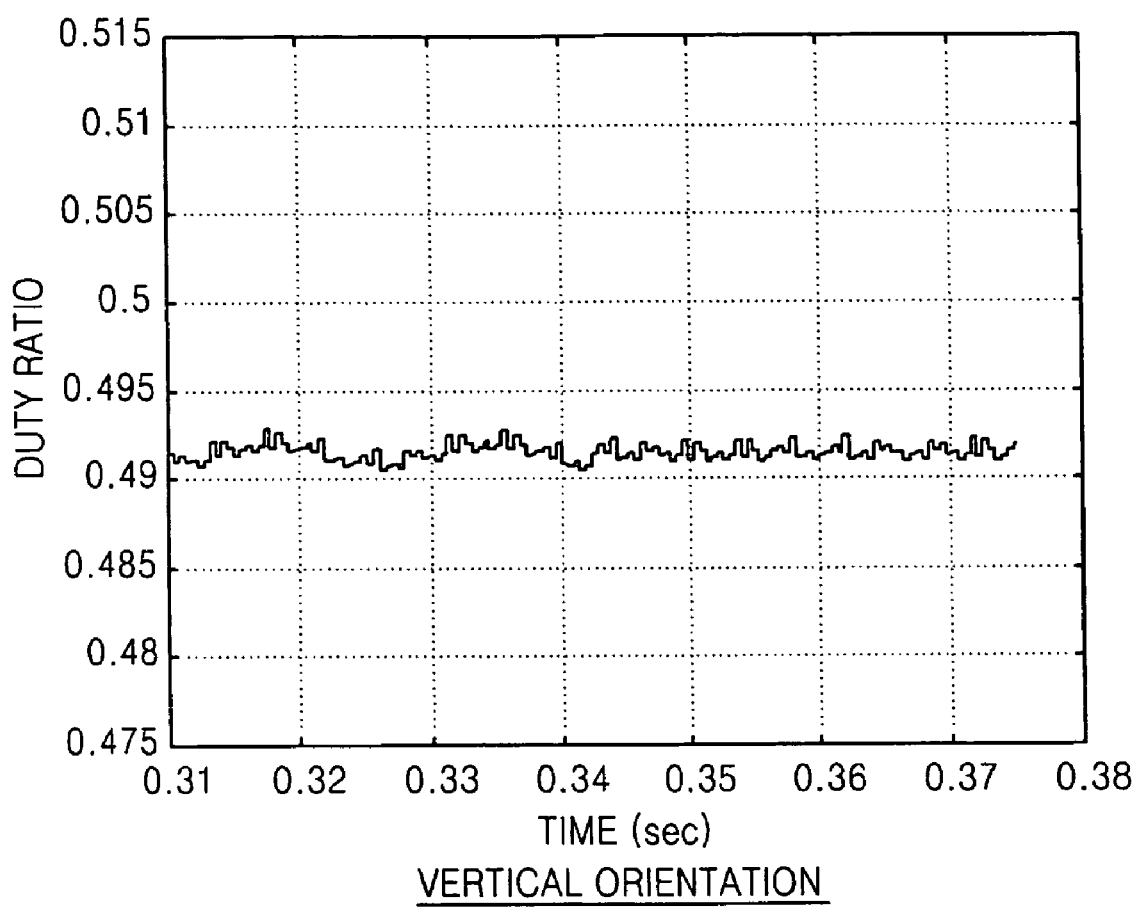

FIGS. 18A through 18C show the PWM duty ratio of the driving signal provided to spindle motor 100 in relation to the three exemplary free-fall orientations. Referring to FIGS. 18A through 18C, the PWM duty ratio decreases when the HDD falls in the horizontal orientation or an oblique orientation. In each of these orientations, the rotation speed of spindle motor 100 increases when the drive device falls. In particular, when the HDD falls in the horizontal orientation, the PWM duty ratio decreases by about 0.62%, and in an exemplary oblique orientation, the PWM duty ratio decreases by about 0.44%.

The static eccentricity of rotary body 120 is the radial distance between the center of rotary body 120 and the center of static body 110. As illustrated in FIG. 2, shaft 121 of rotary body 120 is disposed inside sleeve 117 of static body 110. In addition, the center of rotary body 120 may differ from the center of static body 110 because shaft 121 separates from sleeve 117. Additionally, journal bearing 151 is disposed in the space between rotary body 120 and sleeve 117. When the center of rotary body 120 is disposed at the center of static body 110, the space between sleeve 117 and a portion of shaft 121 disposed in sleeve 117, which is where journal bearing 151 is disposed, is relatively uniform around the outer surface of the portion of shaft 121 disposed in sleeve 117.

When an HDD comprising spindle motor 100 has a resting vertical orientation, journal bearing 151 supports the weight of rotary body 120 and the weight of rotary body 120 exerted on journal bearing 151 may cause rotary body 120 to have a static eccentricity. However, at a certain point in time after the HDD begins falling in the vertical orientation, the weight of rotary body 120 is no longer exerted on journal bearing 151, so rotary body 120 will no longer have a static eccentricity. Thus, it is possible to detect when an HDD is falling in the vertical orientation by measuring the change in static eccentricity of rotary body 120, rather than measuring the change in flying height of rotary body 120.

Figure 19A:
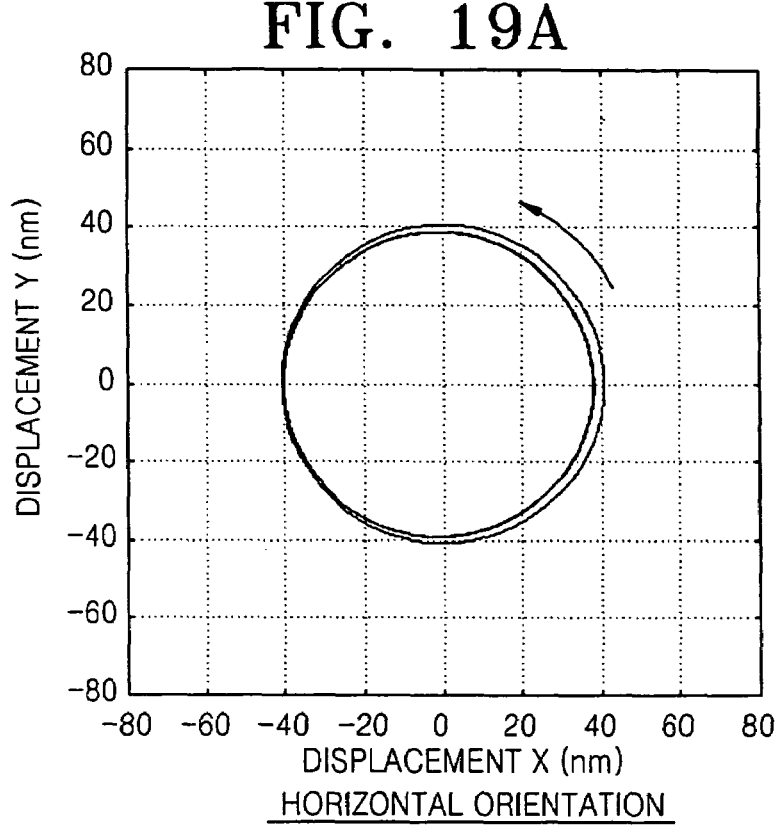
FIGS. 19A through 19C show change in the position of the rotary body in the spindle motor in accordance with the orientation with which the spindle motor falls.
Figure 19B:
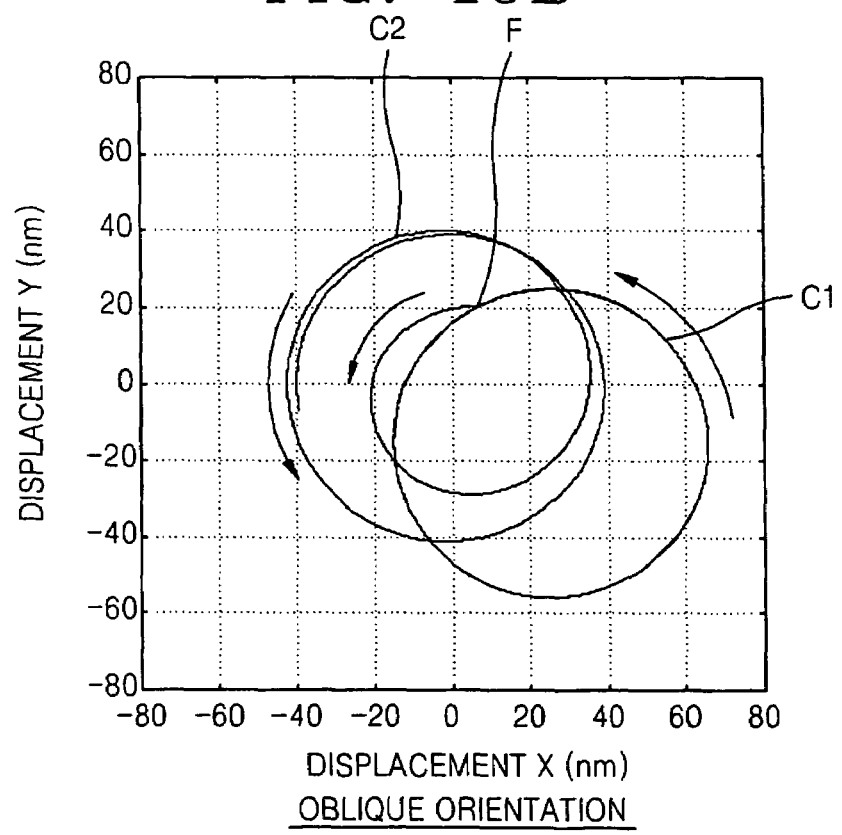
Figure 19C:
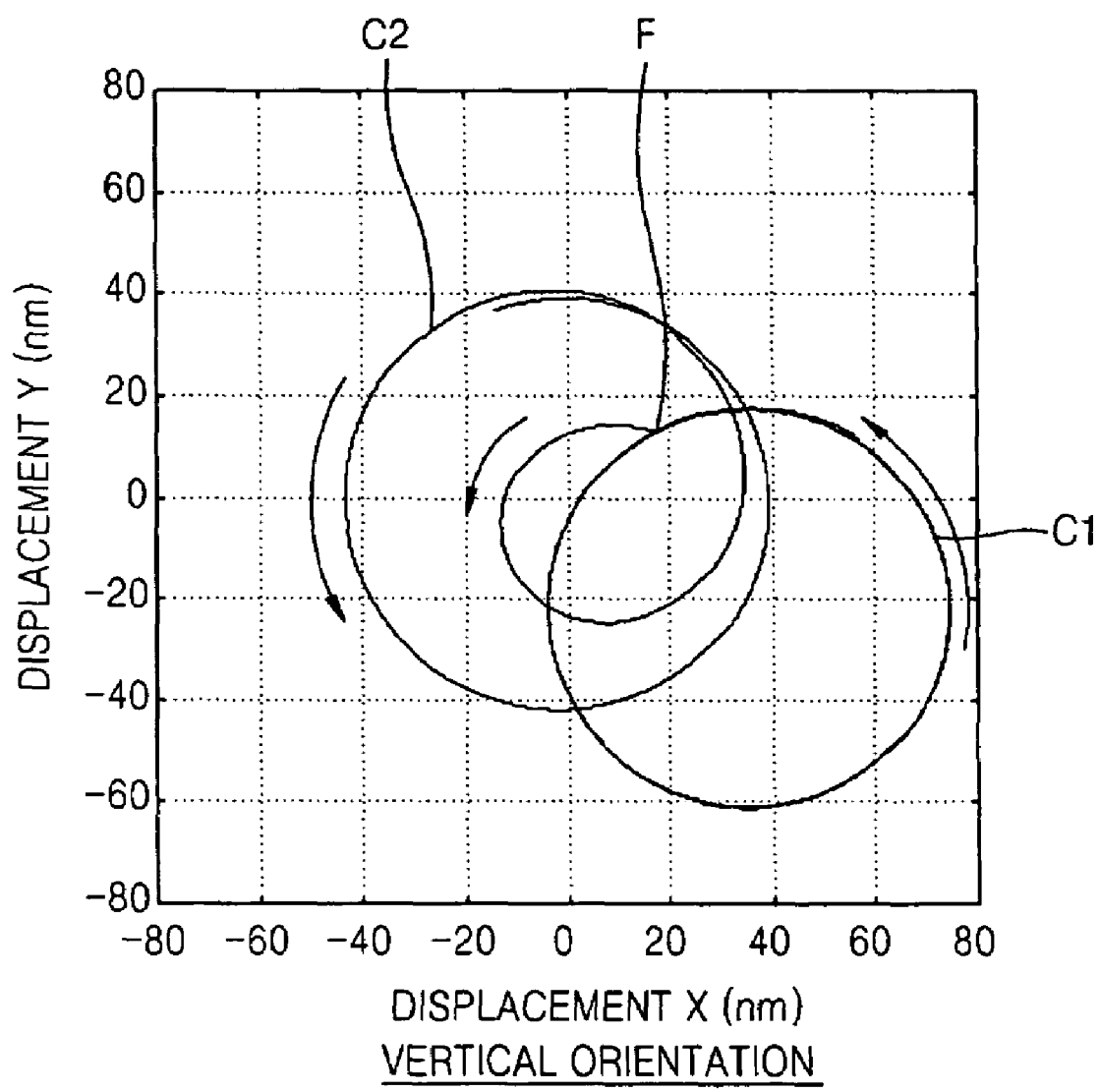

FIGS. 19A through 19C are respective plots of the movement of the center of rotary body 120 before and after an HDD comprising spindle motor 100 begins to fall in each of the exemplary orientations. In the horizontal orientation, the center of rotary body 120 moves around a circle centered approximately about the origin and there is almost no change in the path of rotary body 120 before and after the fall, as shown in FIG. 19A.

FIG. 19C illustrates the path of the center of rotary body 120 before and after an HDD comprising spindle motor 100 begins to fall in the vertical orientation. Circular path C1 of FIG. 19C shows the movement of the center of rotary body 120 in an HDD comprising spindle motor 100 while the HDD has a vertical orientation and before the HDD has begun to fall. While the HDD has a vertical orientation, and before it falls, journal bearing 151 supports the weight of rotary body 120, so journal bearing 151 is compressed by the weight of rotary body 120, which causes the center of rotary body 120 become eccentric, as shown by circular path C1. That is, the center of rotary body 120 moves along a circular path C1 centered approximately on the point (x, y)=(35 nm, −20 nm). The HDD begins to fall at point F shown in FIG. 19C. After the HDD begins to fall, the deformation of journal bearing 151 caused by the weight of rotary body 120 being exerted on journal bearing 151 is removed, so the center of rotary body 120 will no longer be eccentric, but at a point in time after beginning to fall, the center of rotary body 120 will begin to move along a circular path C2 centered approximately about the origin, as shown in FIG. 19C.

FIG. 19B illustrates paths of the center of rotary body 120 before and after the HDD comprising spindle motor 100 begins to fall at an oblique orientation, wherein rotary body 120 is rotating. As illustrated in FIG. 19B, before the HDD falls, the center of rotary body 120 moves along the circular path C1 which is eccentric and is centered approximately on the point (x, y)=(30 nm, −15 nm) of the graph in FIG. 19B. The HDD begins to fall at point F in the graph of FIG. 19B. At a point in time after the HDD begins to fall, journal bearing 151 will no longer be deformed by the weight of rotary body 120 and the center of rotary body 120 will begin to move along the circular path C2 centered about the origin, as shown in FIG. 19B.

Thus, the static eccentricity may be measured from the displacement of the center of rotary body 120 both before and after the fall begins, and the change in static eccentricity, as measured in relation to the orientation of the HDD in free-fall given all of the foregoing assumptions is numerically represented in Table 2:

TABLE 2

| Fall Orientation | Before fall (nm) | After Fall has Begun (nm) |
|---|---|---|
| θx = 0° | 0 | 0 |
| θx = 45° | 35 | 0 |
| θx = 90° | 43 | 0 |

Figure 20A:
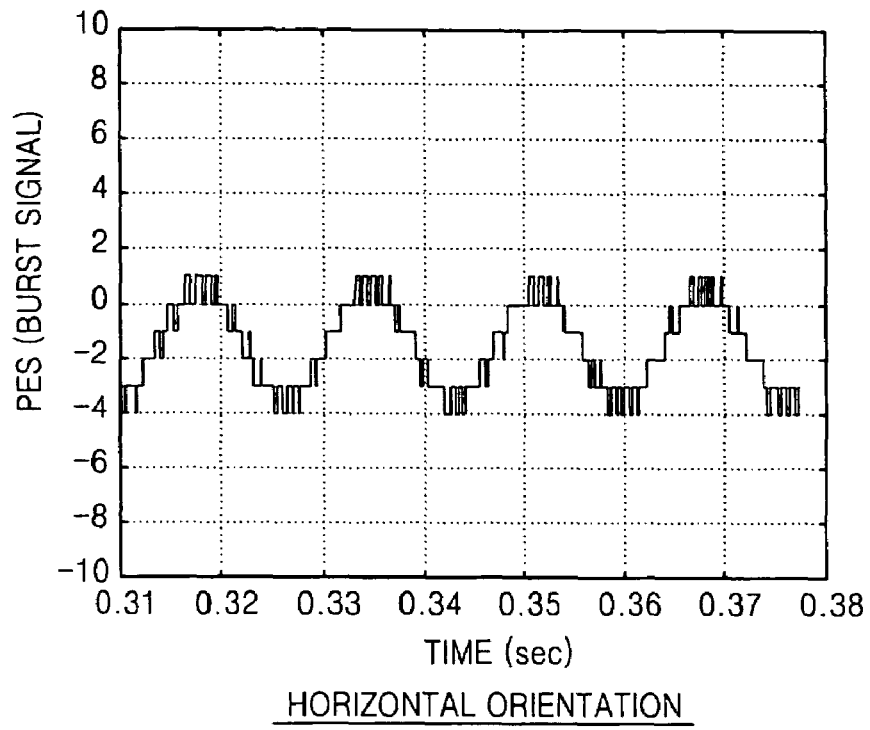
FIGS. 20A through 20C show change in a position error signal in accordance with the orientation with which the spindle motor falls.
Figure 20B:
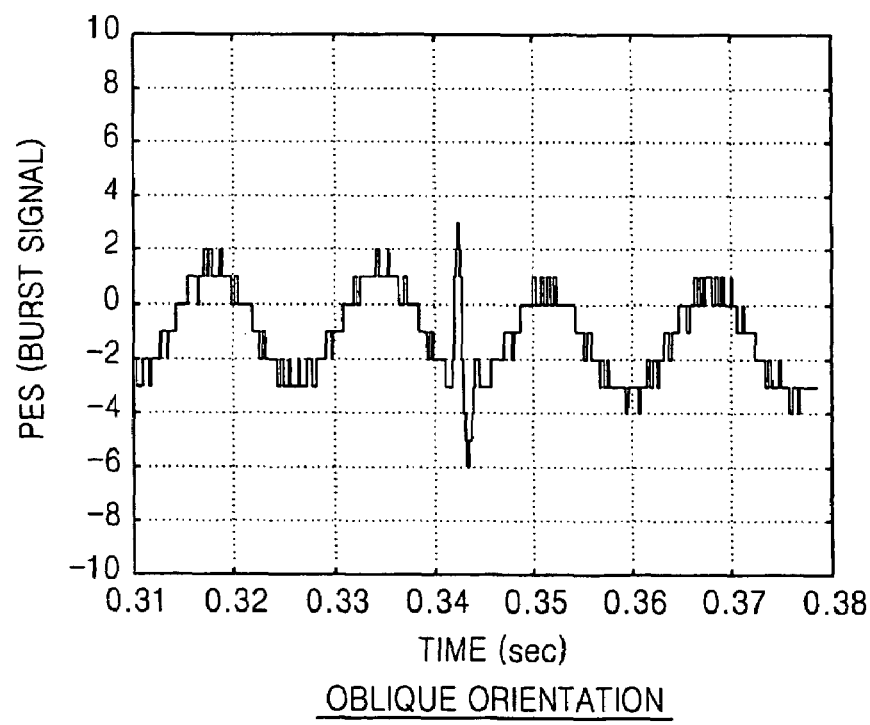
Figure 20C:
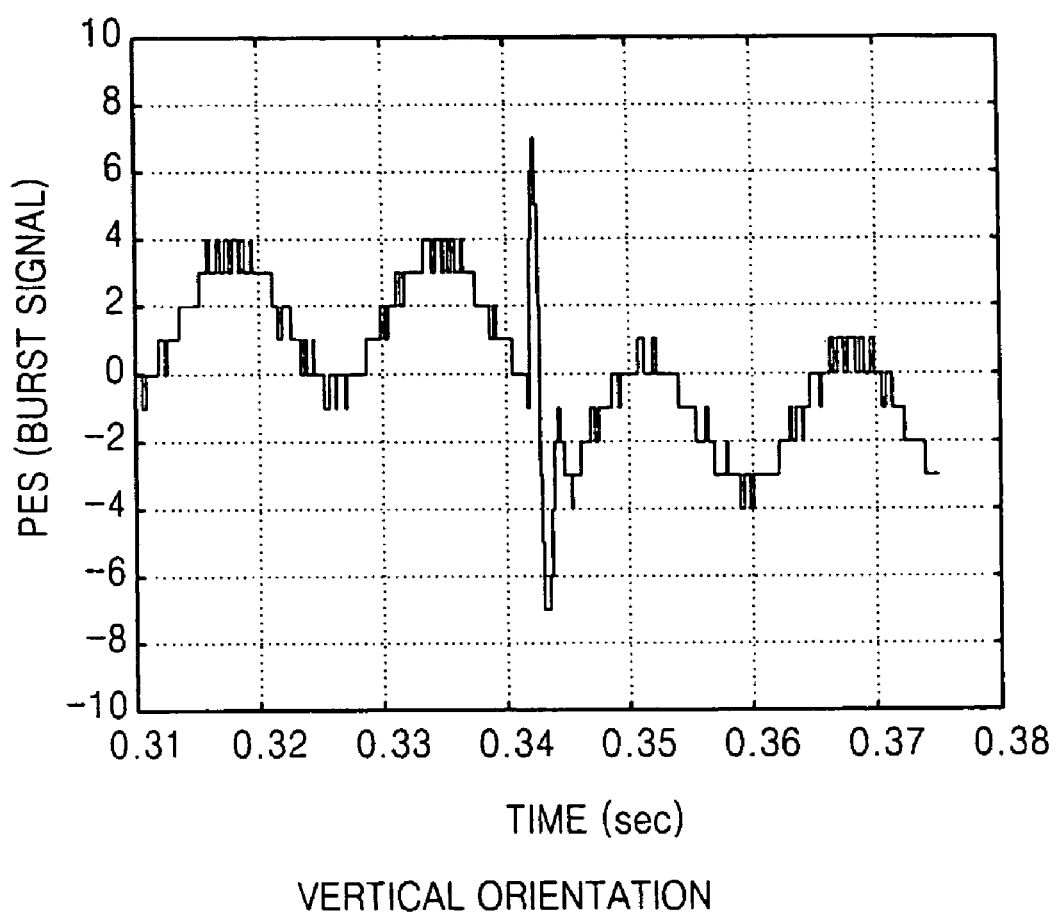

FIGS. 20A through 20C show the change in a position error signal (PES) associated with the HDD before and after it begins to fall in each of the three exemplary orientations. In the vertical orientation, the weight of rotary body 120 is exerted on journal bearing 151 before HDD 100 falls. However, after the HDD begins to fall, the weight of rotary body 120 is no longer exerted on journal bearing 151, which causes rotary body 120 to shift relative to static body 110. In addition, because rotary body 120 shifts relative to static body 110, the respective positions of tracks on disk 130 relative to rotary body 120 also shift. Thus, when the HDD begins to fall, read/write head 161 may lift from a desired track.

Here, a position control loop 400 (see FIG. 23) adapted to correct the tracking error of read/write head 161 monitors the PES to detect a position difference between read/write head 161 and an identified disk track. When read/write head 161 lifts (or deviates) from the target track due to a fall, the PES exhibits a sudden burst. If we assume that the distance between adjacent tracks is divided into 512 units (i.e., counts), the range between an upper peak value and a lower peak value for the burst in the PES (i.e., between a low limit peak and a high limit peak of the burst signal) was measured at about 16 units when the HDD falls in the vertical orientation and about 9 units when the HDD falls in an oblique orientation. However, the actual range of the position error is influenced by the gain and control resolution power of the controller applied to position control loop 400. To remedy the position error caused by the fall and return the read/write head to the target track, position control loop 400 applies a controlled driving signal DRA to VCM 169 in an attempt to move read/write head 161 (see FIG. 23).

Referring for the moment to FIG. 23, in accordance with an embodiment of the invention, a position error sensor 168 is adapted to measure a position error between read/write head 161 and a target track T in real time and generate a corresponding PES. Monitor 200 is adapted to monitor the PES and generate a free-fall signal when it determines that the HDD is in a free-fall state. Monitor 200 is further adapted to monitor the PES in real time and determine that the HDD is in a free-fall state when the PES exhibits a burst, as defined, for example, by the absolute value of a difference between an upper peak value and a lower peak value of the burst in the PES in relation to a threshold value. In addition, a central controller 220 is adapted to initiate an unloading and parking operation to secure read/write head 161 in response to the free-fall signal.

VCM 169 may be driven using a current driving method, in which an input current is applied to VCM 169 as controlled driving signal. Alternately, a voltage driving method may be used in which the controlled driving signal applied to the VCM 169 is an input voltage.

Figure 21A:
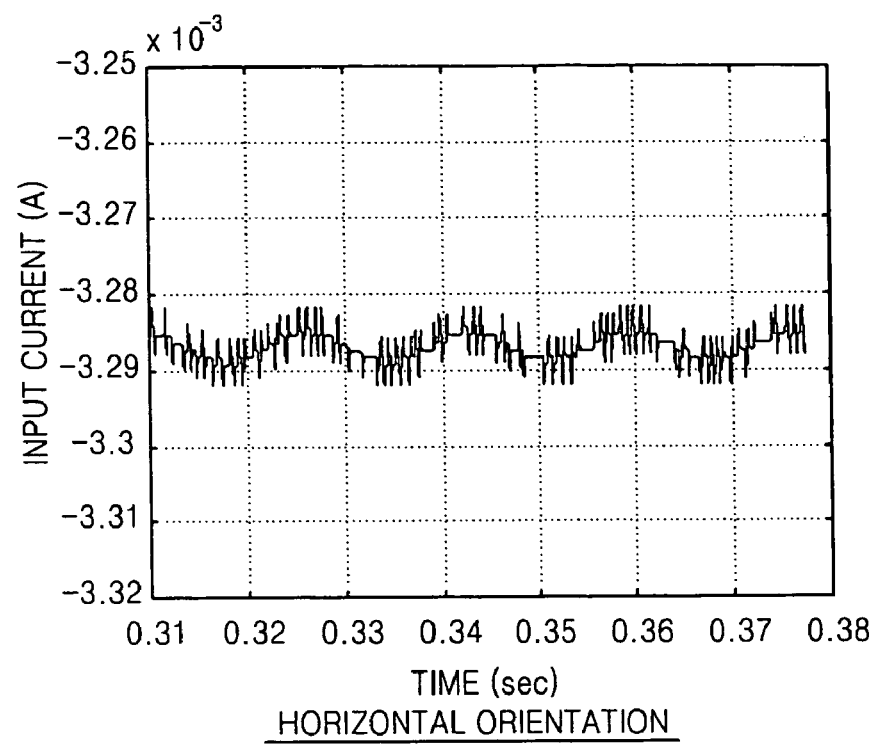
FIGS. 21A through 21C show change in an input current provided to a voice coil motor (VCM) as a controlled driving signal in accordance with the orientation with which the spindle motor falls.
Figure 21B:
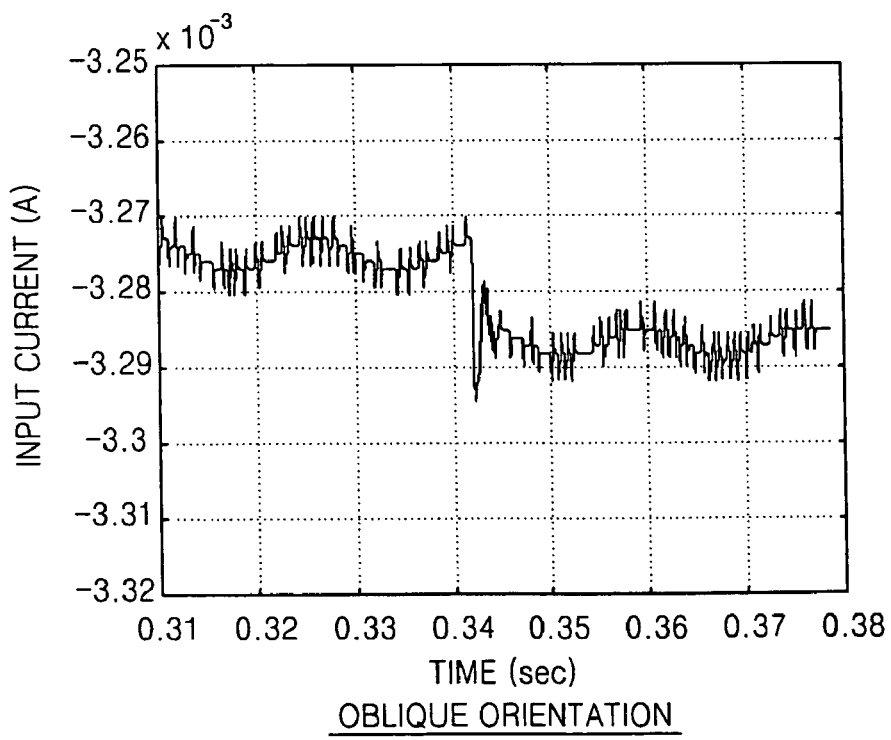
Figure 21C:
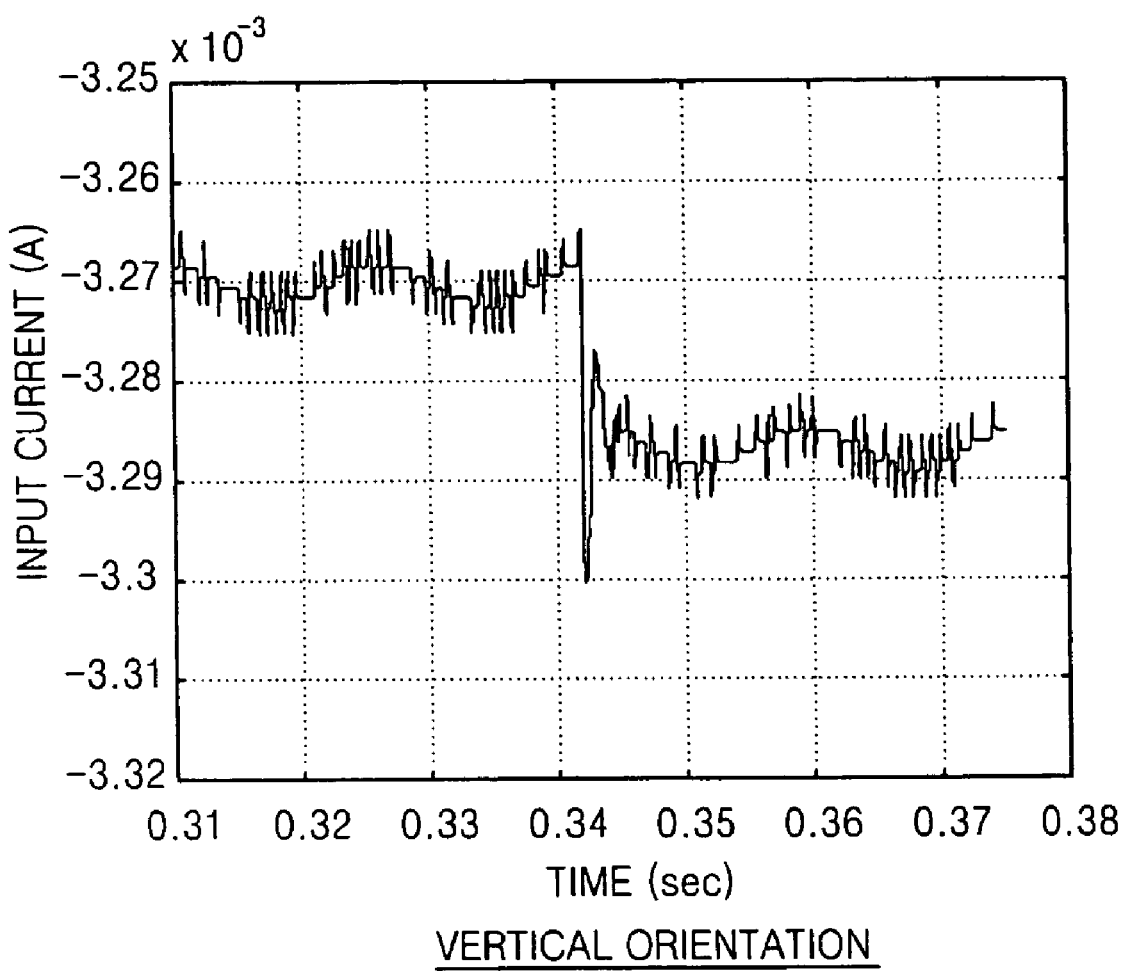

FIGS. 21A through 21C show changes in an input current provided to VCM 169 as the controlled driving signal. To remedy a position error that occurs when the HDD falls in the vertical orientation or an oblique orientation, the driving signal for VCM 169 changes by a relatively great amount immediately after the HDD begins to fall. When the HDD falls with the vertical orientation, the input current changes (near event) by about 0.51%, and when the HDD falls with the exemplary oblique orientation, the input current changes by about 0.36%. Then, a certain amount of time after the HDD begins to fall, the input current returns to a steady state condition with periodic small-scale oscillations. However, when the HDD falls in the horizontal orientation, the driving signal does not change. Since no position error occurs between read/write head 161 and the target track T when the HDD falls in the horizontal orientation, the input current remains in a steady state condition with periodic small-scale oscillations, even as the HDD falls.

Referring again to FIG. 23, in accordance with an embodiment of the invention, monitor 200 is adapted to measure in real time the input current and thereby determine that the HDD is in a free-fall state when a transient percentage change in the input current exceeds a defined threshold value.

Figure 22A:
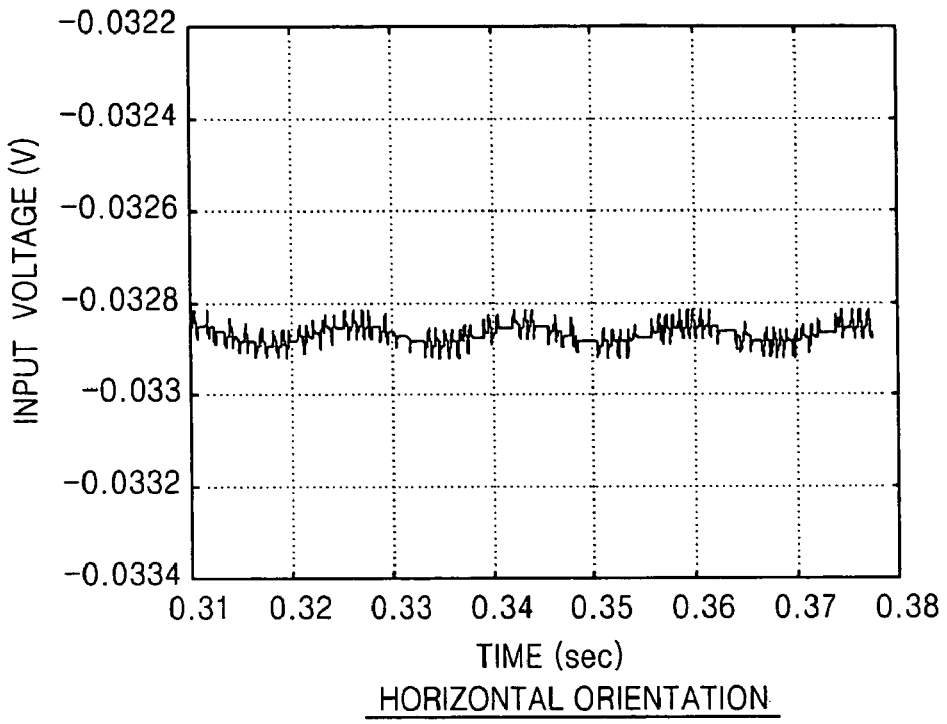
FIGS. 22A through 22C show change in an input voltage provided to the VCM as a controlled driving signal in accordance with the orientation with which the spindle motor falls.
Figure 22B:
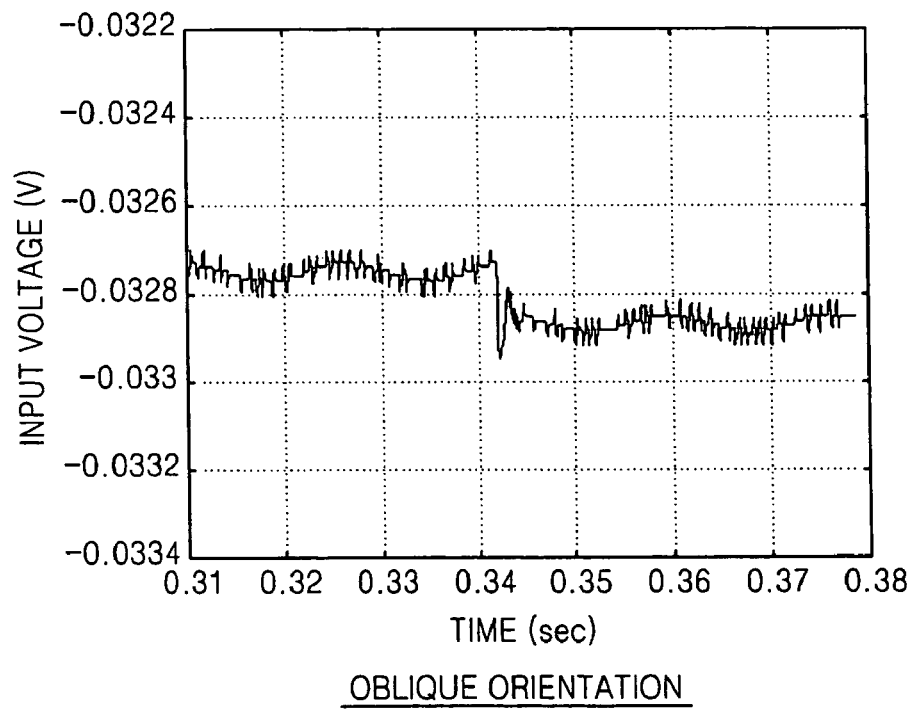
Figure 22C:
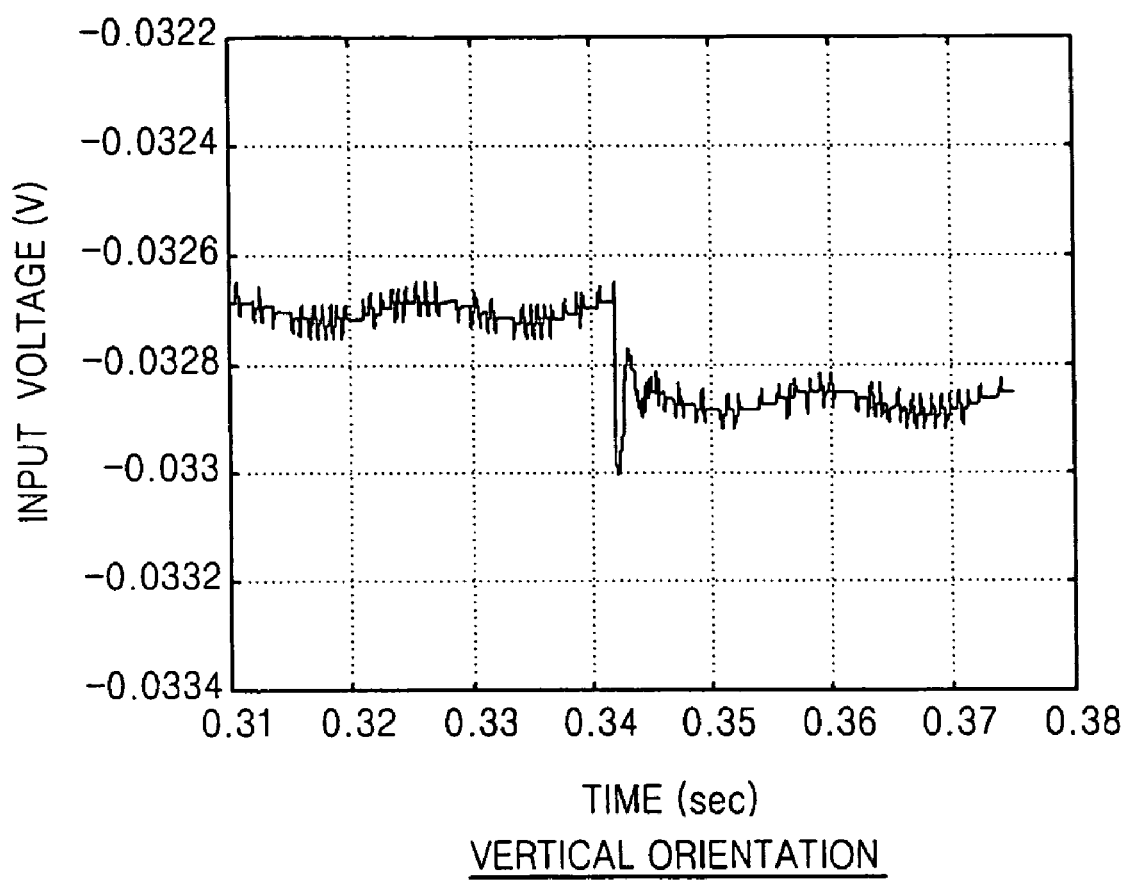

FIGS. 22A through 22C show changes in an input voltage provided to VCM 169 as the controlled driving signal. As with the input current described above, a transient change in the input voltage may be detected when the HDD falls in either the vertical orientation or an oblique orientation. As when using the input current as the controlled driving signal, when the HDD falls in the vertical orientation, the input voltage changes (near event) by about 0.51%, and when the HDD falls in an oblique orientation, the input voltage changes by about 0.36%. Referring to FIG. 23, in accordance with an embodiment of the invention, monitor 200 is adapted to measure in real time the input voltage and determine that the HDD is in a free-fall state when a transient percentage change in the input voltage exceeds a defined threshold value.

As has been seen from the foregoing, system variables adapted to effectively detect a free-fall state for an HDD vary in accordance with the pre-fall and falling orientation of the HDD. Table 3 shows, for each of the exemplary orientations described thus far, variables or combinations of variables that may be used to effectively determine whether an HDD is in a free-fall state relative to each orientation.

TABLE 3

| | Spindle Motor Signal PWM Duty Ratio | Actuator Signal (i.e., VCM Signal) TMR Signal or VCM Input | Free-fall (Spindle Motor Signal + Actuator Signal) |
|---|---|---|---|
| Horizontal Orientation | 100% | 0% | 100% |
| Oblique Orientation | 50% | 50% | 100% |
| Vertical Orientation | 0% | 100% | 100% |

As shown in Table 3, in the horizontal orientation, free-fall may be readily detected using a signal derived in relation to spindle motor 100, e.g., the PWM duty ratio. For example, when the HDD falls in the horizontal orientation, free-fall may be detected by monitoring the PWM duty ratio in real-time and detecting changes of the duty ratio relative to a defined threshold value.

In the vertical orientation, free-fall may be readily detected using a signal derived in relation to the actuator, (e.g., a position error signal between the head and the target track (TMR signal) or the input signal of the VCM (VCM input).

However, unlike the horizontal or vertical orientations, when an HDD falls in an oblique orientation it is impossible to accurately detect a free-fall state using either a spindle motor derived signal or an actuator derived signal alone. It is possible to detect a free-fall state in an oblique orientation by measuring both a spindle motor derived signal and an actuator motor derived signal and monitoring changes in each of these two signals. For example, when an HDD falls in an oblique orientation, free-fall may be detected by the combined monitoring of a transient rate of change of a spindle motor signal and a transient rate of change in an actuator signal relative to defined threshold values. A single combination signal accounting for both of these variables may be obtained by, for example, adding the spindle motor derived signal and the actuator derived signal using appropriate weighting coefficients. Consequently, a spindle motor derived signal and an actuator derived signal may be measured and used to accurately detect a free-fall state for an HDD regardless of orientation.

An exemplary method useful in an HDD to detect free-fall and protect its read/write head from impacting the associated disk, in accordance with an embodiment of the invention, will now be described. FIG. 23 is a block diagram schematically illustrating an HDD in accordance with an embodiment of the invention. This HDD is adapted to detect a free-fall state and safely unload and park read/write head 161 prior to impact. The HDD comprises disk 130, spindle motor 100, and actuator 160 in addition to read/write head 161. The HDD further comprises monitor 200 adapted to measure an input signal provided to spindle motor 100 and detect the free-fall state, and a central controller 220 adapted to operate an emergency power supply 210 in order to initiate read/write head 161 protection operation (i.e., unloading and/or parking the read/write head—hereafter referred to simply as an "unloading/parking operation") in accordance with an output signal generated by monitor 200.

A feedback control loop 300 controls spindle motor 100 in real-time and maintains its rotation speed. Feedback control loop 300 comprises feedback control line "L", central controller 220, a signal line 280, and rotation speed sensor 106. Feedback control loop 300 generates an error signal "e" that corresponds to the difference between the normal rotation speed $\Omega_{ref}$ and the measured rotation speed $\Omega$ of spindle motor 100. The error signal "e" is then converted (through a proportional-integration controller, for example) into a new driving signal DRM having an adjusted PWM duty ratio, and the new driving signal DRM is provided to spindle motor 100. The rotation speed $\Omega$ of spindle motor 100 is measured by counting the number of clock pulses generated during each rotation (i.e., one per unit rotation) of spindle motor 100, by detecting a back electro-motive force (EMF) generated by spindle motor 100, or by measuring the rotational phase of spindle motor 100.

Monitor 200 determines whether the HDD is in a free-fall state in relation to the driving signal DRM output from the proportional-integration controller. Referring to FIG. 23, in accordance with an embodiment of the invention, monitor 200 measures the driving signal DRM in real time and detects changes in the PWM duty ratio of the driving signal. When the PWM duty ratio transiently drops below a critical ratio previously establish by the system, monitor 200 determines that the HDD is in free-fall and generates a corresponding free-fall signal.

In accordance with another embodiment, monitor 200 may measure the driving signal DRM of spindle motor 100 in real time, measure a controlled driving signal for the VCM, and generate a free-fall signal when the monitor determines that the HDD is in a free-fall state. In addition, monitor 200 may be adapted to determine that the HDD is in a free-fall state when a transient change (which may be measured as a percentage change over a defined time period) in the driving signal of the spindle motor exceeds a first preset threshold value, a transient change in the controlled driving signal of the VCM exceeds a second preset threshold value, or a value calculated by combining these detected transient changes exceeds a third preset threshold value.

When the free-fall signal is received from monitor 200, central controller 220 outputs an emergency unloading and/or parking signal. This functionality may be executed using power supplied by emergency power supply 210. For example, responding to an emergency parking signal, emergency power supply 210 may supply the maximum possible operating current (i.e., a maximum useable power) to actuator 160 in order to quickly park read/write head 161 in a safe parking position prior to an anticipated impact resulting from the free-fall. As used herein, a "safe parking position" is any position which, when the read/write head is disposed at that position, the read/write head will not collide with a disk when the corresponding HDD experiences an external impact.

Immediately upon receiving an indication of an emergency unloading and/or parking signal read/write head 161 stops any ongoing read/write operation and is promptly unloaded onto parking ramp 170 outside of the perimeter of disk 130. Conventionally understood HDD parking systems may be classified into ramp systems and contact start stop (CSS) systems. In a ramp system, read/write head 161 is parked on parking ramp 170 located at the outer edge of disk 130. In a CSS system, read/write head 161 is parked at a parking zone located on the inner edge of disk 130.

Figure 24:
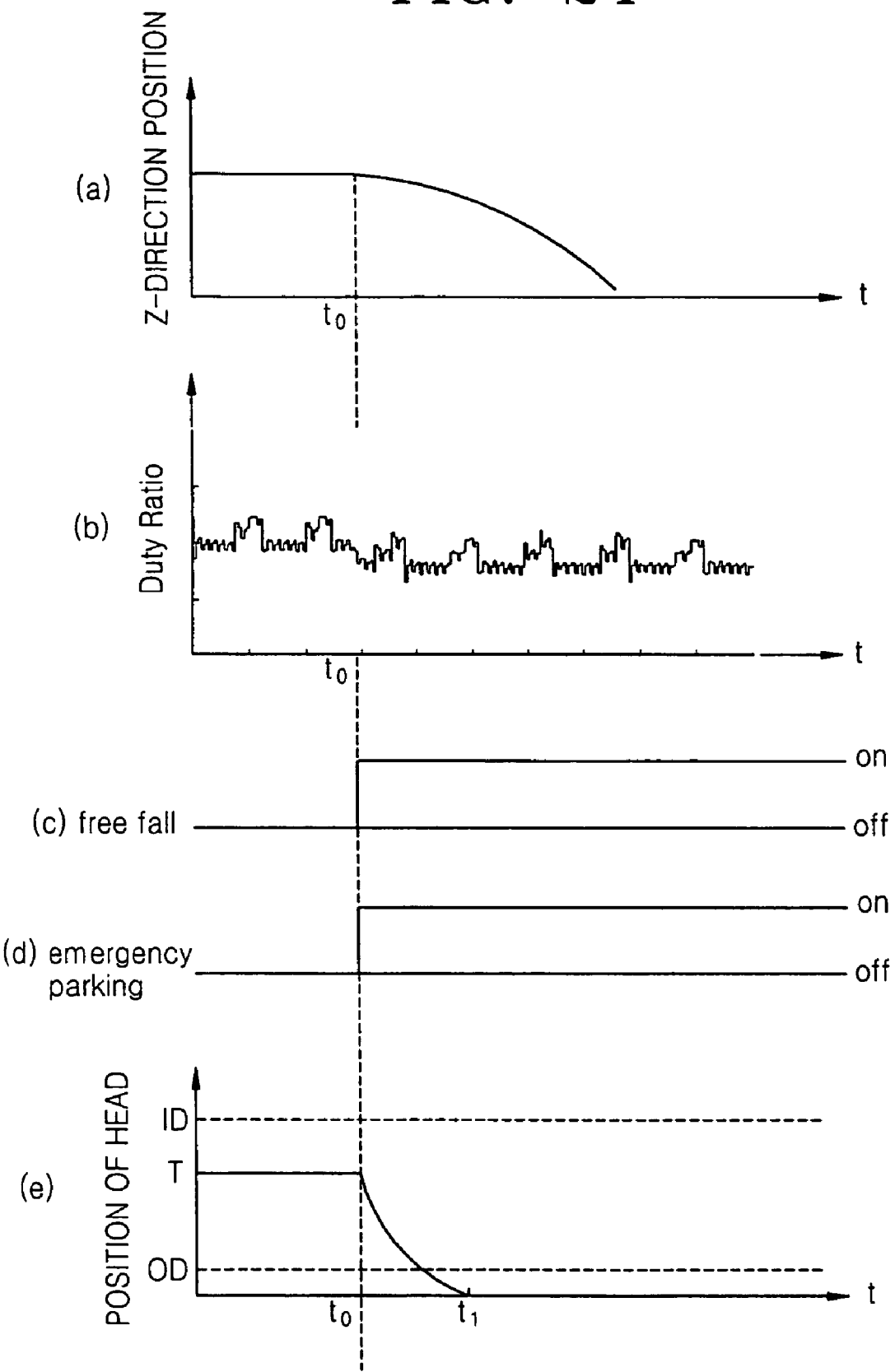

FIG. 24 is a timing diagram for various related internal signals generated in the HDD upon receiving an indication of a free-fall state. The signal graph shown in FIG. 24(a) illustrates an exemplary displacement of the HDD in the direction of gravity (i.e., the z-direction) beginning at time $t=t_0$. FIG. 24(b) illustrates the driving signal of spindle motor 100, wherein the PWM duty ratio suddenly drops when the HDD begins to fall at time $t=t_0$. This sudden transient change in the driving signal is detected in real time by monitor 200. When a free-fall state for the HDD is detected by comparing the change in the PWM duty ratio with a previously defined critical ratio, monitor 200 immediately generates the free-fall signal, as shown in FIG. 24(c) Monitor 200 provides the free-fall signal to central controller 220. Then, as shown in FIG. 24(d), central controller 220 outputs an emergency parking signal to emergency power supply 210. Emergency power supply 210 then applies a maximum usable input current to actuator 160. FIG. 24(e) illustrates the position of read/write head 161. Initially, read/write head 161 is engaged in a read/write operation along target track "T" disposed between an inner boundary (ID) and an outer boundary (OD) of disk 130. However, when the free-fall state for the HDD is detected, read/write head 161 is quickly parked on ramp 170 disposed outside of the outer perimeter of disk 130 (i.e., outside of the outer boundary OD) by operation of actuator 160. As shown in FIG. 24(e), at $t=t_1$, read/write head 161 has been parked on ramp 170.

The exemplary HDD of FIG. 23 incorporates a control method that monitors an input signal applied of spindle motor 100 and determines whether the HDD is in a free-fall state by detecting transient changes in the input signal. However, whether or not the HDD is in a free-fall state may be alternately determined by monitoring the flying height of rotary body 120 with reference to static body 110. For example, referring to FIGS. 2B and 23B, a flying height sensor 102 of conventional design is adapted to measure the flying height associated with rotary body 120 in real time in one embodiment, flying height sensor 102 may be associated with base member 111 (i.e., static body 110). Flying height sensor 102 may be adapted to output the measured flying height as an electrical signal HFLY, which it provides to monitor 200. In addition, monitor 200 may be adapted to monitor the measured flying height, and determine that the HDD is in a free-fall state by detecting that a material increase in the measured flying height relative to a defined threshold value. Also, monitor 200 may be further adapted to generate a free-fall signal when it determines that the HDD is in a free-fall state.

In addition, referring to FIGS. 2B and 23B, spindle motor 100 may be additionally associated with a static eccentricity sensor 104 adapted to measure the static eccentricity of rotary body 120 in real time. Monitor 200 may be connected to static eccentricity sensor 104 and configured to monitor the measured static eccentricity using static eccentricity sensor 104. In addition, monitor 200 may be adapted to determine that the HDD is in a free-fall state by detecting that a variation (e.g., a decrease) in the measured static eccentricity relative to a defined threshold value. Signal line 230 in FIG. 23 conceptually illustrates a connection between static eccentricity sensor 104 and monitor 200.

To detect free-fall of the HDD with a high degree accuracy, regardless of orientation, it may be desirable to monitor both a spindle motor derived signal and an actuator derived signal and use the combination to detect free-fall, as described above with reference to Table 3. Referring again to FIG. 23, actuator 160 moves read/write head 161 over disk 130 under the real time control of position control loop 400. For example, position control loop 400 may be adapted to generate a position error signal PES corresponding to the difference in position between a target track "T" and the actual position of read/write head 161 using a position error sensor 168. Within position control loop 400, controller 220 may be adapted to apply a controlled driving signal DRA to actuator 160 based on the position error signal PES. The controlled driving signal DRA of actuator 160 is monitored in real time monitor 200. In addition, the controlled driving signal DRA of actuator 160 and the driving signal DRM for spindle motor 100 may be simultaneously monitored by monitor 200 so that the HDD can accurately determine the moment at which the HDD enters a free-fall state, regardless of the falls orientation. In response to this determination, the HDD may initiate an operation to protecting read/write head 161. In the illustrated example, position control loop 400 comprises position control line P, central controller 220, position error sensor 168, the actuator 160, and a signal line 270 adapted to provide the controlled driving signal DRA to the actuator 160.

An HDD, in accordance with an embodiment of the invention, is adapted to detect when the HDD is falling and then park the read/write head in a safe parking position prior to impact so that the HDD will be relatively resistant to impact and thus suitable for use in a mobile environment. In addition, unlike a conventional HDD, an HDD in accordance with an embodiment of the invention is adapted to detect when the HDD is falling without the use of an acceleration sensor. Rather, an HDD in accordance with an embodiment of the invention is adapted to detect when it is falling by monitoring changes in system variables selected from among mechanical and electrical variables in the HDD, which makes an HDD in accordance with an embodiment of the invention particularly suitable for mobile products because it does not require an acceleration sensor.

The definition and modification of the various threshold values noted above are deemed to fall within ordinary skill in the art. These values will vary by design and application and in many instances will be defined using empirical data or trail and error.

While embodiments of the invention have been described herein, various changes in form and detail may be made to the embodiment by one of ordinary skill in the art without departing from the scope of the invention as defined by the accompanying claims.

What is claimed is:

1. A hard disk drive (HDD) comprising:
   a spindle motor comprising a rotary body and adapted to rotate a disk;
   an actuator adapted to move a read/write head to a desired position above the disk;
   a flying height sensor adapted to measure in real time a flying height of the rotary body;
   a monitor adapted to monitor the measured flying height and generate a free-fall signal when the monitoring determines that the HDD is in a free-fall state based on at least the measured flying height; and
   a central controller adapted to initiate an unloading/parking operation for the read/write head in response to the free-fall signal.

2. The HDD of claim 1, wherein:
   the spindle motor further comprises a base;
   the flying height sensor is positioned on the base; and
   the flying height sensor is adapted to measure the flying height of the rotary body with reference to the base and output the measured flying height as an electrical signal.

3. The HDD of claim 1, wherein the monitor determines that the HDD is in a free-fall state when the measured flying height exceeds a defined threshold value.

4. The HDD of claim 1, further comprising an emergency power supply, wherein:
   the central controller is adapted to initiate the unloading/parking operation by providing an emergency parking signal to the emergency power supply; and
   the emergency power supply is adapted to provide maximum useable power to the actuator in response to the emergency parking signal.

5. The HDD of claim 1, further comprising a static eccentricity sensor adapted to measure in real time a static eccentricity associated with the rotary body;
   wherein the monitor is further adapted to monitor the measured static eccentricity.

6. A hard disk drive (HDD), comprising:
   a spindle motor comprising a rotary body and adapted to rotate a disk;
   an actuator adapted to move a read/write head to a desired position above the disk;
   a flying height sensor adapted to measure in real time a flying height associated with the rotary body;
   a static eccentricity sensor adapted to measure in real time a static eccentricity associated with the rotary body;
   a monitor adapted to monitor the measured flying height and the measured static eccentricity, and to generate a free-fall signal when the monitoring determines that the HDD is in a free-fall state; and
   a central controller adapted to initiate an unloading/parking operation for the read/write head in response to the free-fall signal,
   wherein the monitor is adapted to determine that the HDD is in a free-fall state upon detecting a variation in the measured flying height of the rotary body relative to a first threshold value, a variation in the measured static eccentricity relative to a second threshold value, or a variation in a calculated value relative to a third threshold value, the calculated value being derived in relation to the measured flying height and the measured static eccentricity.

7. The HDD of claim 6, wherein the spindle motor further comprises a base, the flying height sensor being positioned on the base; and
   wherein the flying height sensor is adapted to measure the flying height of the rotary body with reference to the base and output the measured flying height as an electrical signal.

8. The HDD of claim 6, further comprising:
   an emergency power supply adapted to provide maximum useable power to the actuator in response to an emergency parking signal.

9. The HDD of claim 8, wherein the central controller initiates the unloading/parking operation by providing the emergency parking signal to the emergency power supply.

10. A hard disk drive (HDD), comprising:
    a spindle motor comprising a rotary body and adapted to rotate a disk;
    an actuator adapted to move a read/write head to a desired position above the disk;
    a flying height sensor adapted to measure in real time a flying height associated with the rotary body;
    a static eccentricity sensor adapted to measure in real time a static eccentricity associated with the rotary body;
    a monitor adapted to monitor the measured flying height and the measured static eccentricity, and to generate a free-fall signal when the monitoring determines that the HDD is in a free-fall state;
    a central controller adapted to initiate an unloading/parking operation for the read/write head in response to the free-fall signal; and
    an emergency power supply,
    wherein the central controller is adapted to initiate the unloading/parking operation in response to the free-fall signal by providing an emergency parking signal to the emergency power supply; and the emergency power supply is adapted to provide maximum useable power to the actuator in response to the emergency parking signal.

11. The HDD of claim 10, wherein the spindle motor further comprises a base, the flying height sensor being positioned on the base; and
    wherein the flying height sensor is adapted to measure the flying height of the rotary body with reference to the base and output the measured flying height as an electrical signal.

12. A hard disk drive (HDD) comprising:
    a spindle motor comprising a rotary body and a base, the rotary body rotating a disk;
    an actuator for positioning a read/write head above the disk;

a flying height sensor for measuring a flying height of the rotary body with respect to the base;

a monitor for monitoring the measured flying height and generating a free-fall signal when the monitoring indicates a free-fall state; and a controller for initiating an unloading operation of the read/write head in response to the free-fall signal.

13. The HDD of claim 12, wherein the flying height sensor measures the flying height in real time.

14. The HDD of claim 12, wherein the flying height sensor is positioned on the base.

15. The HDD of claim 12, wherein the monitor determines that the HDD is in a free-fall state when the measured flying height exceeds a threshold.

16. The HDD of claim 12, further comprising:

an emergency power supply for receiving an emergency parking signal from the controller in response to the free-fall signal, the emergency power supply providing maximum useable power to the actuator in response to the emergency parking signal.

* * * * *